(12) United States Patent
Lee et al.

(10) Patent No.: US 11,106,883 B2
(45) Date of Patent: Aug. 31, 2021

(54) METHOD AND APPARATUS FOR PROCESSING DATA CORRESPONDING TO FINGERPRINT IMAGE

(71) Applicant: SAMSUNG ELECTRONICS CO., LTD., Suwon-si (KR)

(72) Inventors: Huijin Lee, Pohang-si (KR); Dongkyun Kim, Suwon-si (KR); Jingu Heo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/445,417

(22) Filed: Jun. 19, 2019

(65) Prior Publication Data
US 2020/0042760 A1 Feb. 6, 2020

(30) Foreign Application Priority Data

Aug. 2, 2018 (KR) .................. 10-2018-0090406
Dec. 20, 2018 (KR) .................. 10-2018-0166604

(51) Int. Cl.
*G06K 9/00* (2006.01)
*G06K 9/20* (2006.01)

(52) U.S. Cl.
CPC ....... *G06K 9/0002* (2013.01); *G06K 9/00067* (2013.01); *G06K 9/209* (2013.01)

(58) Field of Classification Search
CPC ..................................................... G06F 3/044
See application file for complete search history.

(56) References Cited

U.S. PATENT DOCUMENTS

| | | | |
|---|---|---|---|
| 5,963,679 A * | 10/1999 | Setlak | ........ G06K 9/0002 382/312 |
| 7,030,860 B1 | 4/2006 | Hsu et al. | |
| 8,564,314 B2 | 10/2013 | Shaikh et al. | |
| 8,599,150 B2 | 12/2013 | Philipp | |
| 8,867,799 B2 | 10/2014 | Benkley, III | |
| 8,937,607 B2 | 1/2015 | Brown et al. | |
| 9,141,239 B2 | 9/2015 | Yun et al. | |
| 9,990,081 B2 | 6/2018 | Kim | |
| 2017/0316249 A1 | 11/2017 | Lee et al. | |
| 2017/0336906 A1 | 11/2017 | Yoon et al. | |
| 2018/0059856 A1 | 3/2018 | Kim et al. | |

(Continued)

FOREIGN PATENT DOCUMENTS

| | | |
|---|---|---|
| EP | 1538548 A2 | 6/2005 |
| EP | 1 464 029 B1 | 11/2006 |

(Continued)

OTHER PUBLICATIONS

Communication dated Feb. 17, 2020 from the European Patent Office in application No. 19183242.7.

(Continued)

*Primary Examiner* — Joseph R Haley
(74) *Attorney, Agent, or Firm* — Sughrue Mion, PLLC

(57) ABSTRACT

Provided is a method of processing data corresponding to a fingerprint image including obtaining first image data corresponding to a group including a plurality of pixels, and dividing the first image data into second image data corresponding to each of the plurality of pixels based on a plurality of weights corresponding to the plurality of pixels, respectively.

17 Claims, 17 Drawing Sheets

(56) References Cited

U.S. PATENT DOCUMENTS

| | | |
|---|---|---|
| 2018/0060636 A1 | 3/2018 | Hong et al. |
| 2018/0165494 A1 | 6/2018 | Kim |
| 2018/0253587 A1* | 9/2018 | Lowe .................. G06K 9/42 |
| 2019/0042035 A1 | 2/2019 | Kim |
| 2019/0064984 A1* | 2/2019 | Schwartz ............ G06F 3/0412 |
| 2020/0019744 A1 | 1/2020 | Kim |

FOREIGN PATENT DOCUMENTS

| | | |
|---|---|---|
| EP | 3287941 A1 | 2/2018 |
| JP | 2004-272557 A | 9/2004 |
| KR | 10-2017-0124025 A | 11/2017 |
| KR | 10-2017-0129476 A | 11/2017 |
| KR | 10-2018-0022391 A | 3/2018 |
| KR | 10-2018-0024500 A | 3/2018 |
| KR | 10-2018-0067226 A | 6/2018 |
| KR | 10-2019-0015876 A | 2/2019 |

OTHER PUBLICATIONS

Cheng, L., "Interpixel capacitive coupling", Thesis at the Rochester Institute of Technology, Jan. 1, 2009, pp. 1-134, XP055666284.

Donlon, K., et al., "Point-spread Function Ramifications and Deconvolution of a Signal Dependent Blur Kernel Due to Interpixel Capacitive Coupling", Publications of the Astronomical Society of the Pacific, vol. 130, No. 989, Jul. 2018, XP055666299, pp. 1-14.

Wong, A., et al., "General Bayesian estimation for speckle noise reduction in optical coherence tomography retinal imagery", Apr. 6, 2010, Optics Express, vol. 18, No. 8, 15 pages total.

Chikkerur, S., et al., "Fingerprint enhancement using STFT analysis", 2007, Pattern Recognition 40, p. 198-211, 14 pages total.

Girardin, G., et al., "Fingerprint Sensor Applications and Technologies—Consumer Market Focus", Jan. 2017, Yole Development, 42 pages total.

\* cited by examiner

METHOD AND APPARATUS FOR PROCESSING DATA CORRESPONDING TO FINGERPRINT IMAGE

CROSS-REFERENCE TO RELATED APPLICATION

This application claims priority from Korean Patent Application No. 10-2018-0090406, filed on Aug. 2, 2018, and Korean Patent Application No. 10-2018-0166604, filed on Dec. 20, 2018 in the Korean Intellectual Property Office, the disclosures of which are incorporated herein in their entireties by reference.

BACKGROUND

1. Field

Example embodiments of the present disclosure relate to a method and apparatus for processing data corresponding to a fingerprint image.

2. Description of the Related Art

The need for individual authentication using unique features of individuals such as fingerprints, voice, faces, hands or irises has been gradually increasing. Individual authentication functions are mainly used in financial devices, access control devices, mobile devices, laptops, etc. Recently, since mobile devices such as smartphones have been widely used, fingerprint recognition devices for individual authentication have been adopted for the protection of large amounts of security information stored smartphones.

A fingerprint detection apparatus having a high resolution and high sensitivity is required since the accuracy requirement standards of fingerprint detection have increased.

SUMMARY

One or more example embodiments provide methods and apparatuses for processing data corresponding to a fingerprint image.

One or more example embodiments provide a non-transitory computer-readable recording medium having recorded thereon a program for executing the methods in a computer.

Additional aspects will be set forth in part in the description which follows and, in part, will be apparent from the description, or may be learned by practice of example embodiments.

According to an aspect of an example embodiment, there is provided a method of processing data corresponding to a fingerprint image, the method including obtaining first image data corresponding to a group including a plurality of pixels, and dividing the first image data into second image data corresponding to each of the plurality of pixels based on a plurality of weights corresponding to the plurality of pixels, respectively.

The plurality of weights may be determined based on a plurality of mutual capacitances between driving electrodes and detection electrodes respectively corresponding to the plurality of pixels.

The plurality of weights may include a matrix of percentage values based on a combination of the plurality of mutual capacitances.

The matrix may represent a distribution of the percentage values of the plurality of mutual capacitances based on a maximum value of a mutual capacitance among the plurality of mutual capacitances.

The dividing may include obtaining values corresponding to the second image data by combining values corresponding to the first image data with the plurality of weights.

The obtaining may include sequentially applying a driving signal to each of a plurality of driving electrodes included in the group, and obtaining the first image data based on a plurality of electrical signals measured from a plurality of detection electrodes included in the group.

The method may further include determining a mutual capacitance at each of a plurality of nodes where each of a plurality of driving electrodes included in the group and each of a plurality of detection electrodes included in the group intersect.

The determining may include determining a mutual capacitance in a second channel based on a mutual capacitance in a region including a first channel and the second channel, wherein a fixed potential is applied to the first channel, and wherein the second channel is adjacent to the first channel.

The method may further include generating the fingerprint image based on the second image data.

A non-transitory computer-readable recording medium having recorded thereon a computer program, which, when executed by a computer, may perform the method.

According to an aspect of an example embodiment, there is provided a data processing apparatus including at least one processor configured to execute instructions in a computer program, and at least one memory storing at least a part of the computer program, wherein the at least one processor is further configured to obtain first image data corresponding to a group including a plurality of pixels and divide the first image data into second image data corresponding to each of the plurality of pixels based on a plurality of weights corresponding to the plurality of pixels, respectively.

The plurality of weights are determined based on a plurality of mutual capacitances between driving electrodes and detection electrodes respectively corresponding to the plurality of pixels.

The weights may include a matrix of percentage values corresponding to a combination of the plurality of mutual capacitances.

The matrix may include a distribution of the percentage values of the plurality of mutual capacitances based on a maximum value of a mutual capacitance among the plurality of mutual capacitances.

The at least one processor may be further configured to obtain values corresponding to the second image data by combining values corresponding to the first image data with the plurality of weights.

The at least one processor may be further configured to sequentially apply a driving signal to each of a plurality of driving electrodes included in the group, and obtain the first image data based on electrical signals measured from a plurality of detection electrodes included in the group.

The at least one processor may be further configured to determine a mutual capacitance at each of a plurality of nodes where each of a plurality of driving electrodes included in the group and each of a plurality of detection electrodes included in the group intersect.

The at least one processor may be further configured to determine a mutual capacitance in a second channel based on a mutual capacitance in a region including a first channel and the second channel, wherein a fixed potential may be applied to the first channel, and the second channel may be adjacent to the first channel.

The at least one processor may be further configured to generate a fingerprint image based on the second image data.

According to an aspect of an example embodiment, there is provided a data processing apparatus including at least one processor configured to execute instructions in a computer program, at least one memory storing at least a part of the computer program, a transmission circuit configured to provide driving signal to a plurality of driving electrodes, and a reception circuit configured to determine electric signals from a plurality of detection electrodes that cross the plurality of driving electrodes, wherein the at least one processor is further configured to obtain first image data corresponding to a group including a plurality of pixels and divide the first image data into second image data corresponding to each of the plurality of pixels based on a plurality of weights corresponding to the plurality of pixels, respectively.

The data processing apparatus of claim 20, wherein the at least one processor is further configured to generate a fingerprint image based on the second image data.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
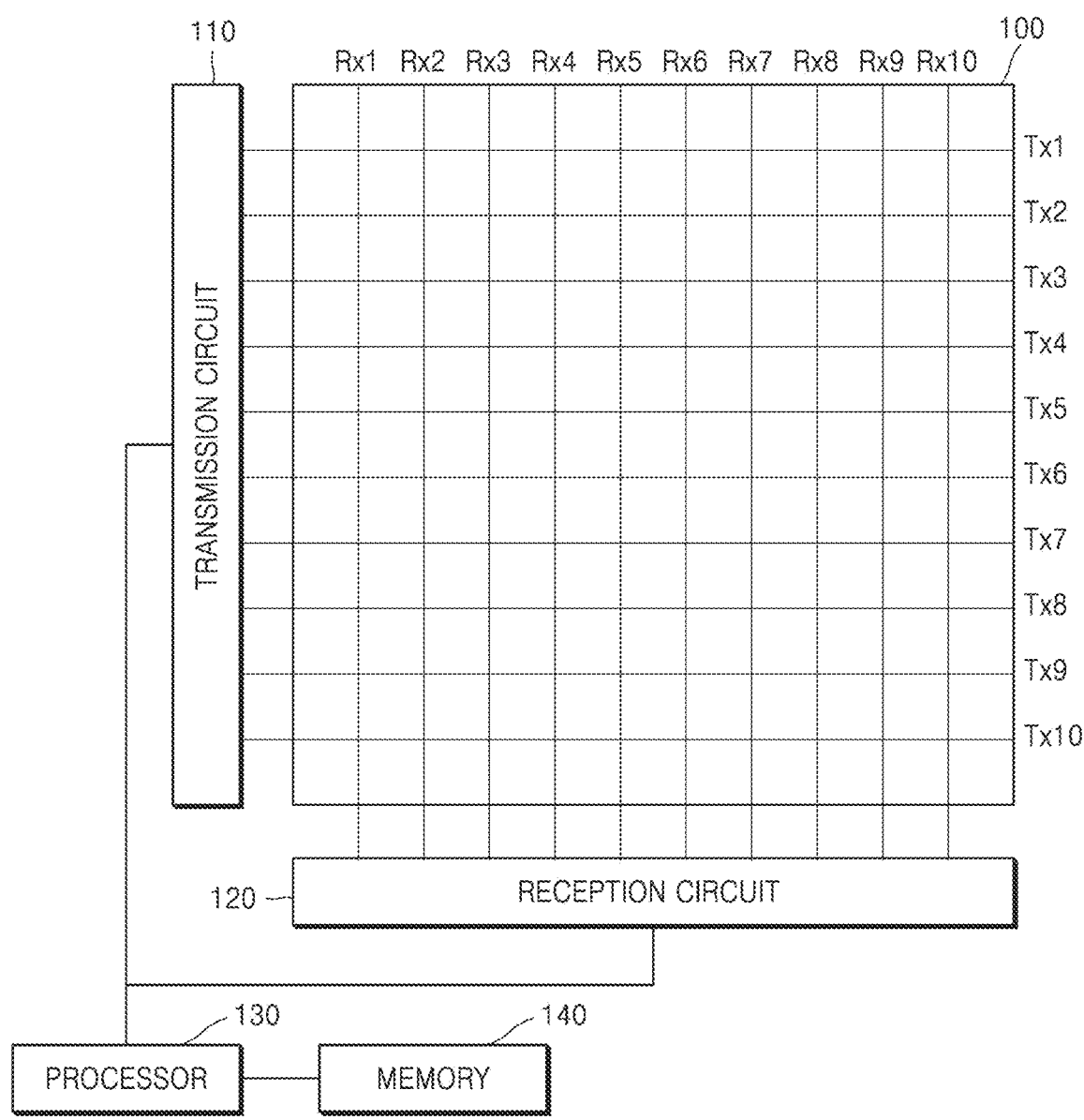
FIG. 1 is a diagram showing an example of a fingerprint image generating system according to an example embodiment.

Reference will now be made in detail to example embodiments which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects.

Throughout the specification, when something is referred to as "including" a component, another component may be further included unless specified otherwise. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Also, as used herein, the terms "units" and "modules" may refer to units that perform at least one function or operation, and the units may be implemented as hardware or software or a combination of hardware and software.

Hereinafter, example embodiments will be described in detail with reference to the accompanying drawings. In this regard, the example embodiments may have different forms and should not be construed as being limited to the descriptions set forth herein.

FIG. 1 is a diagram showing an example of a fingerprint image generating system 1 according to an example embodiment.

Referring to FIG. 1, the fingerprint image generating system 1 may include a touch pad 100, a transmission circuit 110, a reception circuit 120, a processor 130, and a memory 140. FIG. 1 may further include other general purpose components besides the components illustrated.

The processor 130 and the memory 140 of the fingerprint image generating system 1 shown in FIG. 1 may be provided as independent data processing systems.

Also, the processor 130 shown in FIG. 1 may be implemented as an array of a plurality of logic gates, or may be implemented as a combination of a general-purpose microprocessor and a memory storing a program executable in the microprocessor. Embodiments are not limited thereto, and the processor 130 may be implemented as another form of hardware.

The touch pad 100 may include a plurality of driving electrodes Tx and a plurality of detection electrodes Rx formed in a direction crossing the plurality of driving electrodes Tx. In FIG. 1, the number of the driving electrodes Tx and the number of the detection electrodes Rx is 10, respectively, but example embodiments are not limited thereto.

The transmission circuit 110 may include a module applying a driving signal to the driving electrodes Tx and a module measuring an electric signal from the detection electrodes Rx.

The driving electrodes Tx and the detection electrodes Rx of the touch pad 100 may be formed in a direction crossing each other. FIG. 1 shows an example in which the driving electrodes Tx and the detection electrodes Rx are orthogonal to each other, but example embodiments are not limited thereto. In other words, an angle between a direction in which the driving electrodes Tx are formed and a direction in which the detection electrodes Rx are formed may not be 90 degrees.

The mutual capacitance between each of the driving electrodes Tx and the detection electrodes Rx of the touch pad 100 may be changed when a user's finger approaches the touch pad 100. For example, the mutual capacitance at each of nodes where the driving electrodes Tx and the detection electrodes Rx intersect with each other in the touch pad 100 may be changed according to a shape of a fingerprint pattern of a user. The smaller the interval between the driving electrodes Tx and the interval between the detection electrodes Rx, the higher the resolution of a fingerprint sensor. The touch pad 100 may further include a protective film for protecting the driving electrodes Tx and the detection electrodes Rx.

For example, the driving electrodes Tx and the detection electrodes Rx may include line electrodes. Each of the driving electrodes Tx may further include predetermined patterns provided between the nodes where the driving electrodes Tx and the detection electrodes Rx intersect. The above-described patterns may have various shapes such as a polygonal shape, a circular shape, etc. Likewise, each of the detection electrodes Rx may further include predetermined patterns provided between the above-described nodes.

The transmission circuit 110 may apply a driving signal to the driving electrodes Tx. For example, the transmission circuit 110 may apply a voltage pulse to each of the driving electrodes Tx. The reception circuit 120 may measure an electrical signal from the detection electrodes Rx. As an example, the reception circuit 120 may measure a current flowing in each of the detection electrodes Rx. As another example, the reception circuit 120 may measure a potential of each of the detection electrodes Rx.

The processor 130 may generally control operations of the transmission circuit 110 and the reception circuit 120 included in the fingerprint image generating system 1. For example, the processor 130 may control magnitude of the voltage pulse applied to each of the driving electrodes Tx by the transmission circuit 110, an application time, and the like. Also, the processor 130 may control the transmission circuit 110 to apply the voltage pulse to some of the driving electrodes Tx.

The processor 130 may generate and process data related to a fingerprint using the current or potential received by the reception circuit 120. For example, the processor 130 may generate data corresponding to a fingerprint image by using the current or potential received by the reception circuit 120 and generate the fingerprint image by using pixel values included in the data. Hereinafter, an example in which the processor 130 processes data to generate a fingerprint image will be described in detail with reference to FIGS. 2 to 16.

The memory 140 may store a computer program required for the operation of the processor 130. For example, processor 130 may perform an operation according to instructions in the computer program stored in the memory 140. The memory 140 may also store data and other information generated when the touch pad 100, the transmission circuit 110, the reception circuit 120 and the processor 130 operate and may store an intermediate fingerprint image and a final fingerprint image generated when the processor 130 operates. In FIG. 1, the fingerprint image generating system 1 is shown as including one memory 140, but embodiments are not limited thereto. For example, the fingerprint image generating system 1 may include two or more memories.

Figure 2:
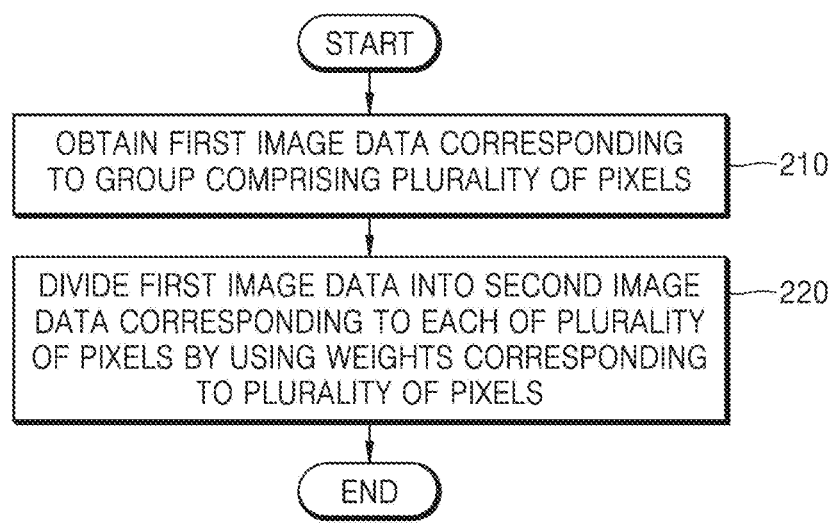
FIG. 2 is a flowchart showing an example of a data processing method according to an example embodiment.

FIG. 2 is a flowchart showing an example of a data processing method.

Referring to FIG. 2, the data processing method may include operations that are time serially processed in the fingerprint image generating system 1 shown in FIG. 1. Therefore, it will be understood that descriptions provided above with respect to the fingerprint image generating system 1 shown in FIG. 1 apply to the data processing method of FIG. 2.

In operation 210, the processor 130 may obtain first image data corresponding to a group including a plurality of pixels. Here, a pixel may include four adjacent nodes. For example, a rectangle having vertexes of four nodes adjacent to each other may include one pixel. Also, the first image data may correspond to an image representing a body of a user who touches the touch pad 100. For example, when a user's finger touches the touch pad 100, the first image data may be data corresponding to a fingerprint image of the finger touching the touch pad 100. Hereinafter, an example in which the processor 130 obtains the first image data will be described with reference to FIGS. 3 to 14. Specifically, example processes performed by the processor 130 of obtaining the first image data and calculating mutual capacitances between the driving electrodes Tx and the detection electrodes Rx related to the pixels included in the group will be described.

In operation 220, the processor 130 may divide the first image data into second image data corresponding to each of the plurality of pixels using weights corresponding to the plurality of pixels. Here, a weight may be calculated based on the mutual capacitances between the driving electrodes Tx and the detection electrodes Rx related to the plurality of pixels. The weight may be expressed in the form of a matrix. Elements of the matrix may include percentage values according to a combination of the mutual capacitances. Thus, the elements of the matrix may represent distribution of a weighting function.

The processor 130 may divide the first image data into the second image data by using the previously calculated and stored weights corresponding to the plurality of pixels. For example, the processor 130 may divide the first image data into the second image data by using weight values stored in the memory 140. For example, the weights may be stored in the memory 140 as a look-up table.

The processor 130 may calculate a weight corresponding to a pixel and divide the first image data into the second image data by using the calculated weight. Also, the weight stored in the memory 140 may be updated by the processor 130. Hereinafter, an example of a weight will be described in detail with reference to FIGS. 15A through 15C.

The first image data may be data representing the entire pixels included in the group. Meanwhile, the second image data may be data representing each of the pixels included in the group. For example, the processor 130 may combine values corresponding to the first image data with the weights to obtain values corresponding to the second image data.

Generally, a quality of obtaining an image by a system employing a capacitive touch pad may decrease when a thickness of the touch pad increases. For example, when the touch pad is disposed in a display of a device, passivation layer may be disposed on the touch pad. When a fingerprint image of a user is generated, a difference between the mutual capacitance corresponding to a ridge of a fingerprint and the mutual capacitance corresponding to a valley of the ridge may be inversely proportional to the square of a thickness of the passivation layer. Therefore, when the thickness of the passivation is greater than a certain value, it may be difficult to detect the difference in the mutual capacitances of the ridge and the valley of the fingerprint.

Accordingly, the processor 130 according to an example embodiment may group the plurality of driving electrodes Tx and the detection electrodes Rx that are adjacent to each other and measure a first mutual capacitance between the driving electrodes Tx and a second mutual capacitance between the detection electrodes Rx, thereby obtaining the first image data. For example, since the difference in the mutual capacitances due to the ridge and the valley of the fingerprint is proportional to the size of an effective electrode, a large signal proportional to the number of the driving electrodes Tx and the detection electrodes Rx adjacent to each other may be detected. Therefore, even when a passivation layer having a thickness of a certain value or more, for example, a thickness of several hundreds of urn or more, is disposed on the touch pad 100, a difference between the ridge and the valley of the fingerprint may be greater.

However, according to the first image data, data for each of the pixels may not be distinguished. Therefore, the quality of the image generated using the first image data may be low.

The processor 130 according to an example embodiment may divide first image data into the second image data by using the weight corresponding to the pixel. Also, the processor 130 may generate the image corresponding to each of the pixels by using the second image data. Accordingly, the processor 130 may generate an image of higher quality. Hereinafter, an example in which the processor 130 divides the first video data into the second video data will be described with reference to FIG. 16 below.

Figure 3:
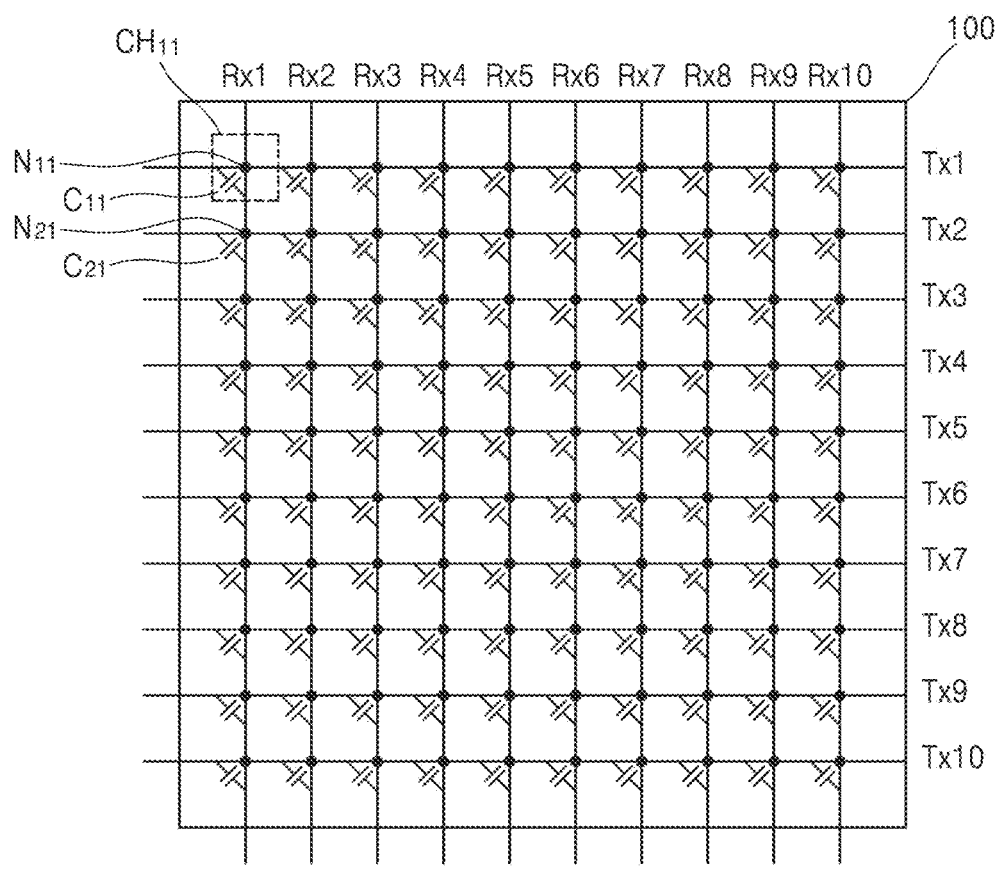
FIG. 3 is a diagram conceptually illustrating a mutual capacitance corresponding to each node of a touch pad according to an example embodiment.

FIG. 3 is a diagram conceptually illustrating a mutual capacitance corresponding to each of nodes of the touch pad 100 according to an example embodiment.

Referring to FIG. 3, the mutual capacitances between the driving electrodes Tx and the detection electrodes Rx may correspond to the nodes where the driving electrodes Tx and the detection electrodes Rx cross each other.

For example, a mutual capacitance C11 between a first driving electrode Tx1 and a first detection electrode Rx1 may correspond to a node N11 where the first driving electrode Tx1 and the first detection electrode Rx1 intersect. Likewise, a mutual capacitance Cmn between an mth driving electrode Txm (where, m is an arbitrary natural number) and an nth detection electrode Rxn (where, n is an arbitrary natural number) may correspond to a node Nmn where the mth driving electrode Txm and the nth detection electrode Rxn intersect. Hereinafter, a mutual capacitance at the node Nmn may mean a mutual capacitance between the mth driving electrode Txm and the nth detection electrode Rxn.

A plurality of channels may be defined in the touch pad 100 by the driving electrodes Tx and the detection electrodes Rx. For example, the channels may be rectangular regions surrounded by the driving electrodes Tx and the detection electrodes Rx. Also, each of the channels may correspond to a node. For example, a channel $CH_{11}$ may correspond to the node $N_{11}$.

For example, different driving signals may be sequentially applied to each of the driving electrodes Tx to measure a mutual capacitance of each of a plurality of nodes. Further, electric signals may be individually measured at each of the detection electrodes Rx. For example, when the mutual capacitance $C_{11}$ is to be measured, a driving signal may be applied only to the first driving electrode Tx1, and an electric signal may be measured at the first detection electrode Rx1. Similarly, when the mutual capacitance Cmn is to be measured, a driving signal may be applied only to the mth driving electrode Txm and an electric signal may be measured at the nth detection electrode Rxn.

According to the example described above, to measure the mutual capacitance of each node, a driving signal may be applied to only one driving electrode Tx. However, in the case of a high-resolution fingerprint sensor, intervals between the driving electrodes Tx may be very narrow. When the intervals between the driving electrodes Tx are narrow, an area of the channel CH that is activated during measurement of the mutual capacitance may be reduced. When the area of the channel CH to be activated is reduced, the intensity of an obtained signal may be weak. And, the magnitude of the mutual capacitance measured at each of the nodes may be reduced. Thus, it may be difficult to accurately detect a variation of the mutual capacitance of each of the nodes.

The processor 130 according to an example embodiment may group the driving electrodes Tx into a plurality of driving groups and control the transmission circuit 110, thereby sequentially applying drive signals to each of the driving groups. Here, the at least two driving electrodes Tx may be included in a single drive group.

Hereinafter, an example in which a driving signal is applied to a driving group will be described with reference to FIGS. 4 and 5 according to an example embodiment.

Figure 4:
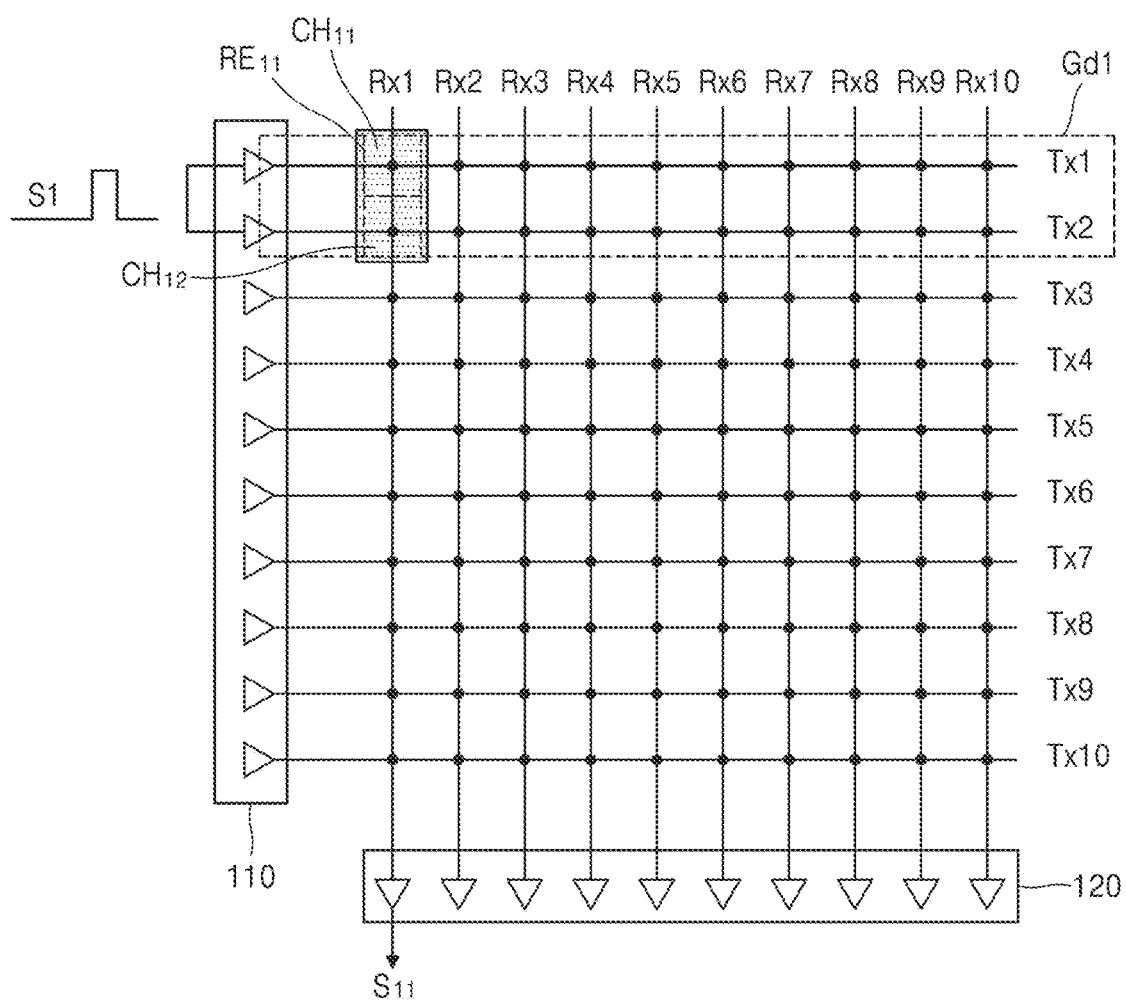
FIG. 4 is a diagram for explaining an example in which a driving signal is applied to a driving group according to an example embodiment.

FIG. 4 is a diagram for explaining an example in which a driving signal S1 is applied to a first driving group Gd1.

Referring to FIG. 4, the processor 130 may group the driving electrodes Tx1 and Tx2 into the first driving group Gd1, and the transmission circuit 110 may apply the driving signal S1 to the first driving group Gd1. For example, the transmission circuit 110 may apply the same voltage pulse to the first driving group Gd1.

In FIG. 4, the first driving group Gd1 includes the driving electrodes Tx1 and Tx2, but example embodiments are not limited thereto. In other words, the first driving group Gd1 may include any two or more driving electrodes among the driving electrodes Tx.

The reception circuit 120 may individually measure signals at each of the plurality of detection electrodes Rx. When the first driving group Gd1 includes n driving electrodes Tx (where, n is an arbitrary natural number), and the reception circuit 120 measures signals at one detection electrode Rx, a region activated $RE_{11}$ in the touch pad 100 may include nx1 channels.

For example, when the first driving group Gd1 includes the first driving electrode Tx1 and the second driving electrode Tx2, and the reception circuit 120 measures a signal $S_{11}$ at the first detection electrode Rx1, the activated region $RE_{11}$ may include two channels $CH_{11}$ and $CH_{22}$. Here, REmn denotes a region activated by an mth driving group Gd_m and an nth detection electrode Rx_n. A signal Smn means an electric signal measured by the reception circuit 120 when REmn is activated. GCmn denotes a mutual capacitance value at REmn derived from the signal Smn.

In the example described above, the driving signal S1 may be applied to the first driving group Gd1, and a mutual capacitance $GC_{11}$ in the activated region $RE_{11}$ may be derived from the signal $S_{11}$ measured at the first detection electrode Rx1. The mutual capacitance $GC_{11}$ in the activated region $RE_{11}$ may be a combination of the mutual capacitance $C_{11}$ corresponding to the channel $CH_{11}$ and a mutual capacitance $C_{12}$ corresponding to the channel $CH_{12}$.

As shown in FIG. 4, when the transmission circuit 110 applies the driving signal S1 to the first driving group Gd1 in which the plurality of driving electrodes Tx, the first driving electrode Tx1 and the second driving electrode Tx2, are grouped, the number of channels included in the activated region $RE_{11}$ when the reception circuit 120 measures the signal may be increased. Therefore, the intensity of the signal measured by the reception circuit 120 may be intensified. Therefore, the performance of the fingerprint image generating system 1 may be improved.

When the transmission circuit 110 applies the driving signal S1 to the first driving group Gd1, the reception circuit 120 may sequentially measure the signals in each of the plurality of detection electrodes Rx.

Figure 5:
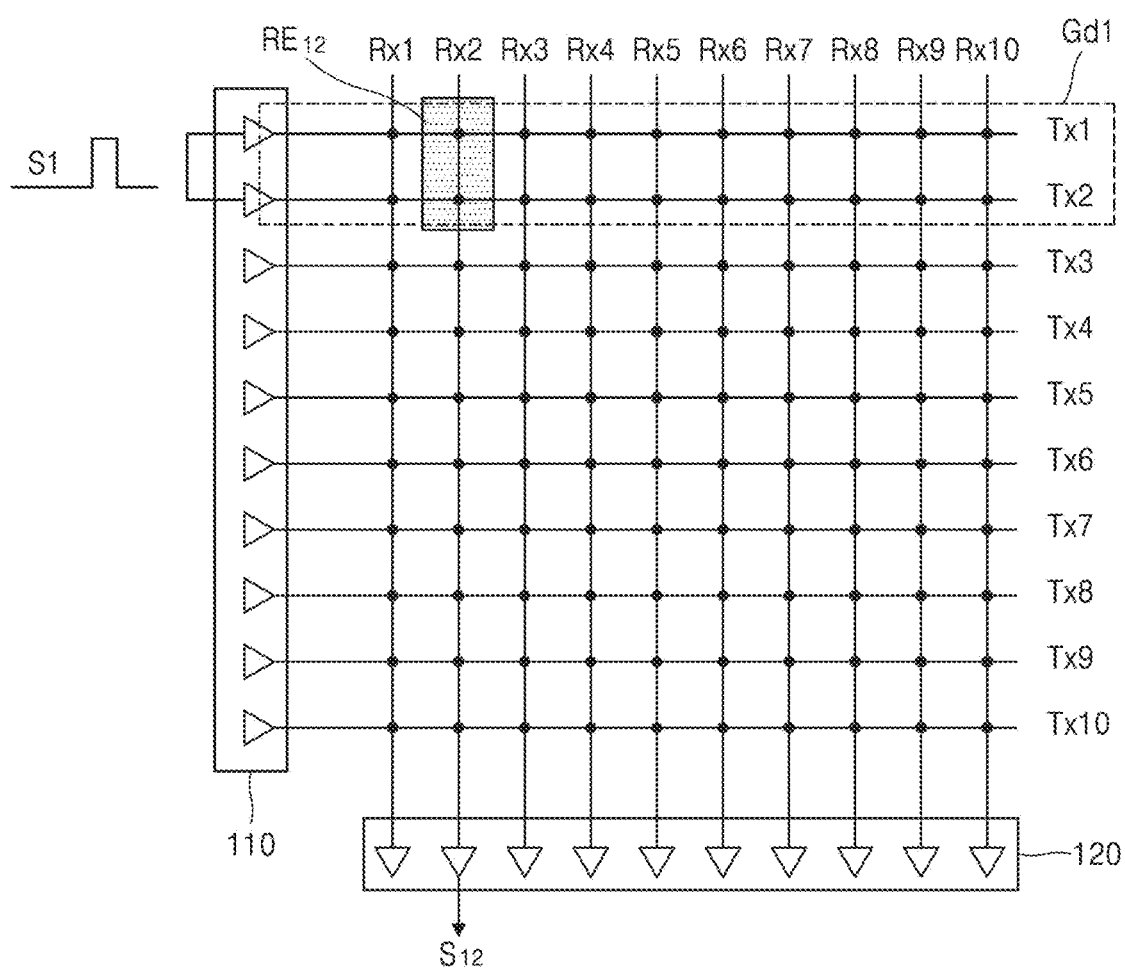
FIG. 5 is a diagram for explaining an example in which a reception circuit measures an electrical signal at a second detection electrode according to an example embodiment.

FIG. 5 is a diagram for explaining an example in which the reception circuit 120 measures an electric signal at a second detection electrode according to an example embodiment.

Referring to FIG. 5, the reception circuit 120 shown in FIG. 4 may change the detection electrodes Rx that measures signals. For example, the reception circuit 120 may sequentially change the order of the detection electrodes Rx measuring the electrical signal. When the reception circuit 120 changes the detection electrodes Rx measuring the electric signals, an activated region $RE_{12}$ may also move. The activated region REnm may move in a horizontal direction when the reception circuit 120 changes the order of the detection electrodes Rx measuring the electric signals.

The activated region RE may also move in the vertical direction when the transmission circuit 110 changes the order of the driving groups Gd applying driving signals.

Although an order is given to each of the plurality of drive groups Gd as described above, embodiment are not limited thereto, and the order in which the driving signals are applied may vary. For example, the transmission circuit 110 may apply the driving signal to a third driving group Gd3 after applying the driving signal to the first driving group Gd1, and apply the driving signal to a second driving group Gd2.

Also, in FIGS. 3 and 4, the driving group Gd includes the two driving electrodes Tx, but embodiments are not limited thereto. For example, the driving group Gd may include k+1 driving electrodes Tx (k is an arbitrary natural number). For example, an nth driving group Gd_n (n is an arbitrary natural number) may include nth to n+kth driving electrodes Tx_n, . . . , Tx_n+k.

FIGS. 3 and 4 show examples in which the reception circuit 120 outputs an electric signal from each of the plurality of detection electrodes Rx individually. However, the embodiment is not limited thereto. For example, the reception circuit 120 may group the plurality of detection electrodes Rx into a plurality of detection groups and sequentially measure electrical signals output from the plurality of detection groups.

Hereinafter, an example in which an electric signal of a detection group is measured will be described with reference to FIGS. 6 and 7.

Figure 6:
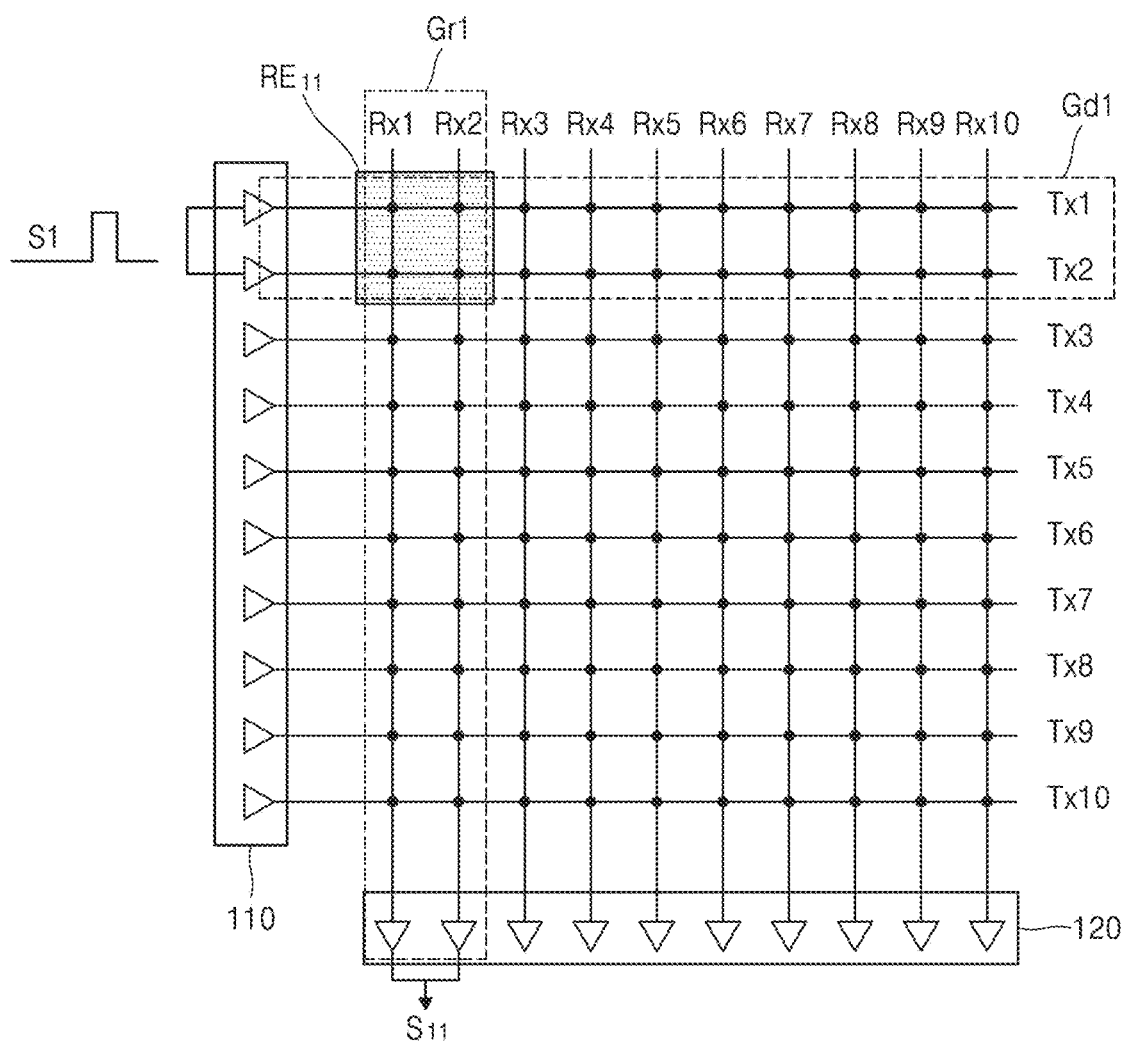
FIG. 6 shows an example in which a detection group includes two detection electrodes according to an example embodiment.

FIG. 6 shows an example in which a first detection group Gr1 includes two detection electrodes Rx1 and Rx2 according to an example embodiment.

Referring to FIG. 6, the processor 130 may group the two detection electrodes Rx into the detection group Gr. The processor 130 may group the first and second detection electrodes Rx1 and Rx2 into the first detection group Gr1, and the reception circuit 120 may measure an electrical signal output from the first detection group Gr1. That is, the reception circuit 120 may measure the electric signal obtained by summing electric signals output from the first and second detection electrodes Rx1 and Rx2 included in the first detection group Gr1.

As shown in FIG. 6, when the first drive group Gd1 includes the two driving electrodes Tx1 and Tx2, and the first detection group Gr1 includes the two detection electrodes Rx1 and Rx2, the region $RE_{11}$ activated by the first driving group Gd1 and the first detection group Gr1 may include 2×2 channels. When the processor 130 groups the plurality of detection electrodes Rx into the detection group Gr and the reception circuit 120 measures the electrical signal from the first detection group Gr1, the size of the activated region RE may be increased when measuring the electric signal. Therefore, the magnitude of the electric signal to be measured may be increased, and a mutual capacitance of the activated region RE may be more accurately derived therefrom.

Figure 7:
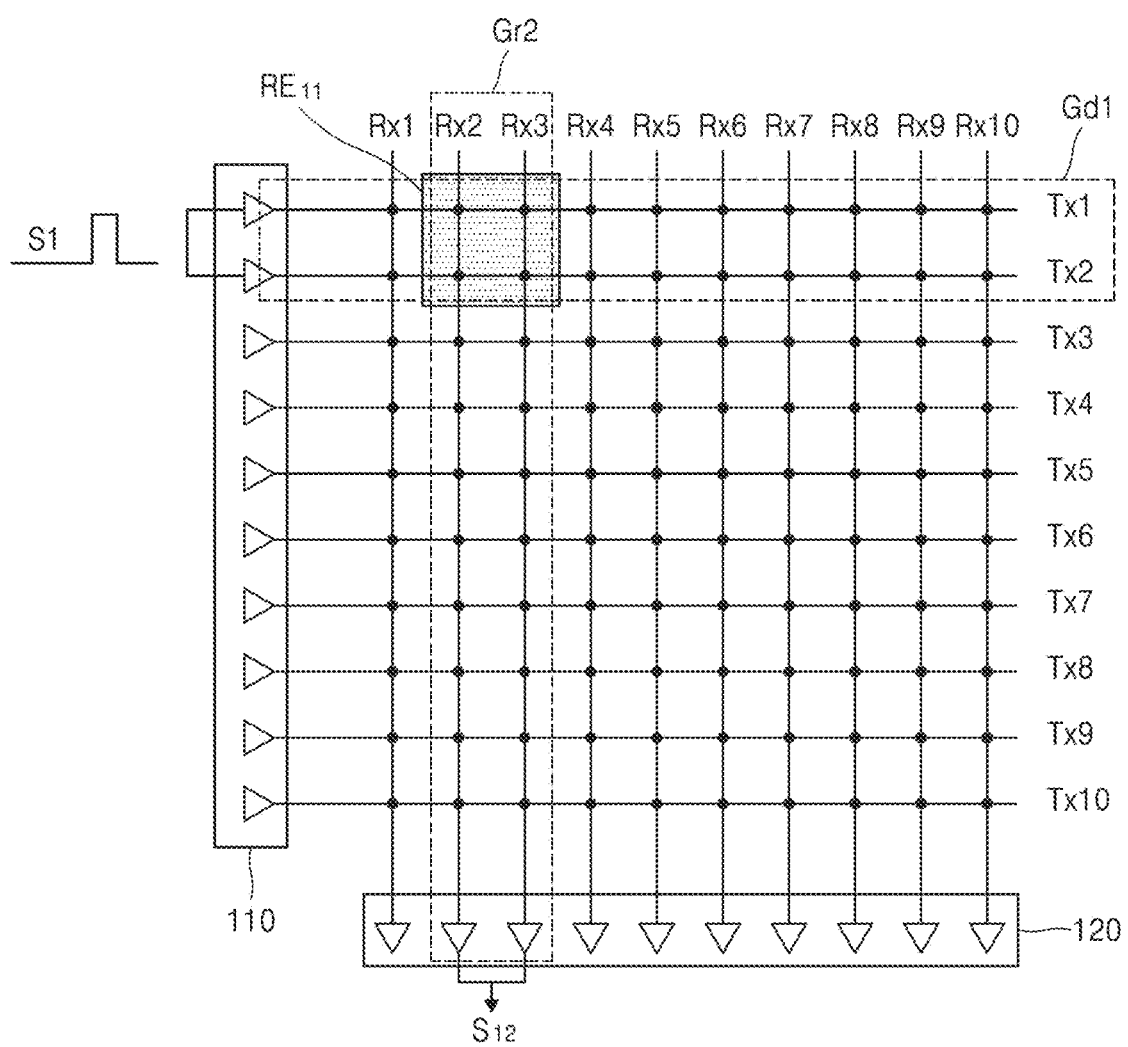
FIG. 7 is a diagram showing an example in which a reception circuit changes the order in which detection groups measure electrical signals according to an example embodiment.

FIG. 7 is a diagram showing an example in which the reception circuit 120 changes the order of the detection groups Gr measuring electric signals according to an example embodiment.

Referring to FIG. 7, the reception circuit 120 may measure an electrical signal output from a second detection group Gr2. Here, the second detection group Gr2 may include the second and third detection electrodes Rx2 and Rx3. The reception circuit 120 may sequentially change the order of the detection groups Gr measuring the electric signals. A position of the activated region RE may move in a horizontal direction when the reception circuit 120 changes the order of the detection groups Gr measuring the electric signals. The region $RE_{12}$ activated by the second detection group Gr2 may include the region $RE_{11}$ activated by the first detection group Gr1 and the channels $CH_{12}$ and $CH_{22}$ overlapping with each other.

The reception circuit 120 may sequentially change the order of the detection electrodes Rx included in the detection group Gr every time the order of the detection groups Gr is changed. For example, the reception circuit 120 may further increase the order of the detection electrodes Rx included in the detection group Gr one by one each time the order of the detection groups Gr increases one by one. That is, when the first detection group Gr1 includes the first and second detection electrodes Rx1 and Rx2, the second detection group Gr2 may include the second and third detection electrodes Rx2 and Rx3. That is, the arbitrary nth detection group Gd_n may include the nth detection electrode Tx_n and an (n+1)th detection electrode Tx_n+1.

As described above with reference to FIGS. 6 and 7, the order is given to each of the detection groups Gr. However, embodiments are not limited thereto. For example, the reception circuit 120 may measure an electric signal output from a third detection group Gr3 after measuring an electric signal output from the first detection group Gr1, and measure an electric signal output from the second detection group Gr2.

Also, FIGS. 6 and 7 show examples in which the detection group Gr includes the two detection electrodes Rx, but embodiments are not limited thereto. For example, the detection group Gr may include k+1 detection electrodes Rx (k is an arbitrary natural number). For example, the nth detection group Gr_n (n is an arbitrary natural number) may include the nth to n+kth detection electrodes Rx_n, . . . , Rx_n+k.

Figure 8:
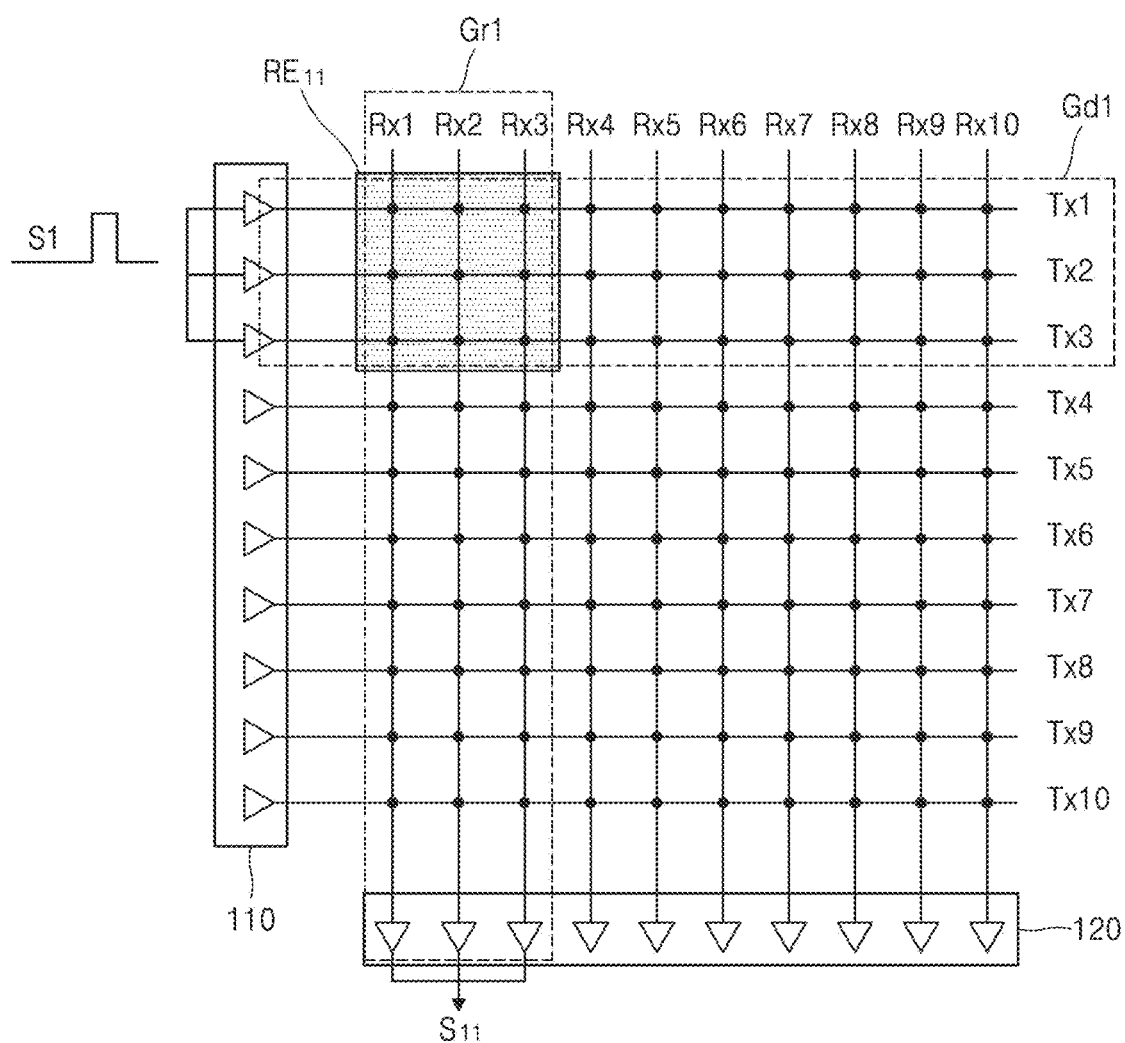
FIG. 8 is a diagram showing an example in which an activated region includes 3×3 channels according to an example embodiment.

FIG. 8 is a diagram showing an example in which the activated region $RE_{11}$ includes 3×3 channels according to an example embodiment.

Referring to FIG. 8, the driving group Gd may include three driving electrodes Tx, and the detection group Gr may include three detection electrodes Rx. For example, the first driving group Gd1 may include the first through third driving electrodes Tx1, Tx2, and Tx3, and the first detection group Gr1 may include the first through third detection electrodes Rx1, Rx2, and Rx3. The region $RE_{11}$ activated by the first driving group Gd1 and the first detection group Gr1 may include 3×3 channels.

Examples of grouping the driving electrodes Tx and the detection electrodes Rx are described with reference to FIGS. 6 to 8 above. The above-described embodiments are merely examples and the embodiments are not limited thereto. For example, the number of the driving electrodes Tx included in the driving group Gd and the number of the detection electrodes Rx included in the detection group Gr may be different from the above examples.

Meanwhile, the processor 130 may calculate a mutual capacitance of each of a plurality of nodes where the plurality of driving electrodes Tx and the plurality of detection electrodes Rx intersect respectively, from an electric signal measured in the reception circuit 120. For example, the processor 130 may include a hardware resource capable of performing an operation of calculating the mutual capacitance of each of a plurality of nodes.

The processor 130 may calculate the mutual capacitance of each of the nodes in consideration of positions of the nodes. For example, the processor 130 may differently determine a weight of a mutual capacitance measured in each of the plurality of driving groups Gd based on the positions of the nodes. Also, the processor 130 may differently determine a weight of a mutual capacitance measured in each of the plurality of detection electrodes Rx. That is, the processor 130 may differently determine a weight of the mutual capacitance GCmn in each of the regions Remm activated by each of the plurality of driving groups Gd_m and each of the plurality of detection electrodes Rx_n.

Figure 9:
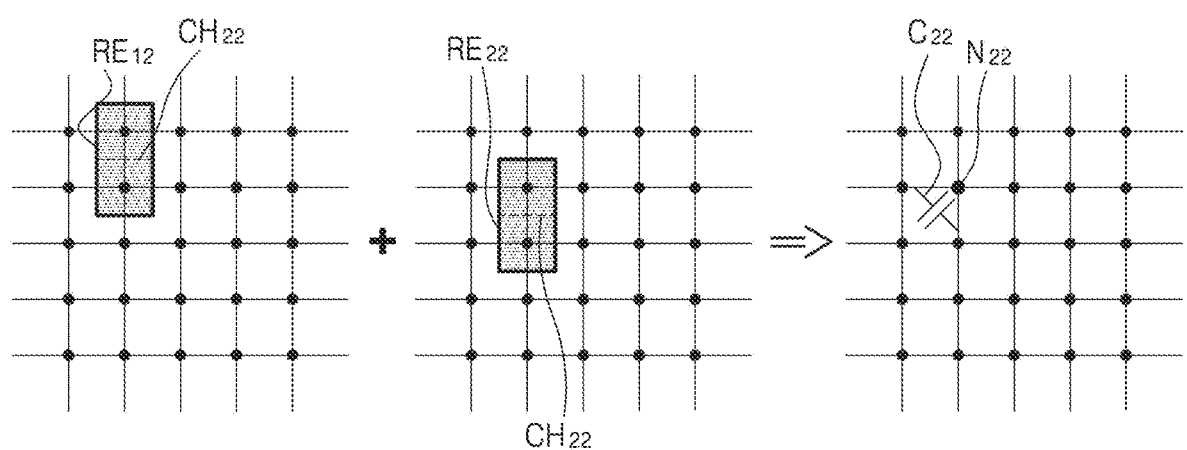
FIG. 9 is a diagram for explaining an example in which a processor calculates a mutual capacitance of a node according to an example embodiment.

FIG. 9 is a diagram for explaining an example in which the processor 130 calculates a mutual capacitance $C_{22}$ of a node $N_{22}$ according to an example embodiment.

FIG. 9 shows an example where the activation region RE includes 2×1 channels, as shown in FIGS. 4 and 5. Referring to FIG. 9, the regions $RE_{12}$ and $RE_{22}$ may include the channel $CH_{22}$ corresponding to the node $N_{22}$. The processor 130 may calculate the mutual capacitance C12 of the region $RE_{12}$ from the electric signal $S_{12}$ measured by the reception circuit 120 in the second detection electrode Rx2 when the transmission circuit 110 applies a driving signal to the first driving group Gd1. The processor 130 may calculate the mutual capacitance $C_{22}$ of the region $RE_{22}$ from the electric signal $S_{22}$ measured by the reception circuit 120 in the second detection electrode Rx2 when the transmission circuit 110 applies a driving signal to the second driving group Gd2.

Considering that a proportion occupied by the channel $CH_{22}$ in the region $RE_{12}$ is ½ and a proportion occupied by the channel $CH_{22}$ in the region $RE_{22}$ is ½, the processor 130 may calculate the mutual capacitance $C_{22}$ by uses Equation 1 below.

$$C_{22} = \frac{GC_{12} + GC_{22}}{2} \quad \text{[Equation 1]}$$

The processor 130 may determine a weight of a mutual capacitance $GC_{12}$ obtained by a combination of the first driving group Gd1 and the second detection electrode Rx2 as ½ as shown in Equation 1 above. Further, the processor 130 may determine a weight of a mutual capacitance $GC_{22}$ obtained by a combination of the second driving group Gd2 and the second detection electrode Rx2 as ½. The processor 130 may determine weights of mutual capacitance values obtained by combinations of the remaining driving groups Gd and detection electrodes Rx other than the two combinations as 0.

Figure 10:
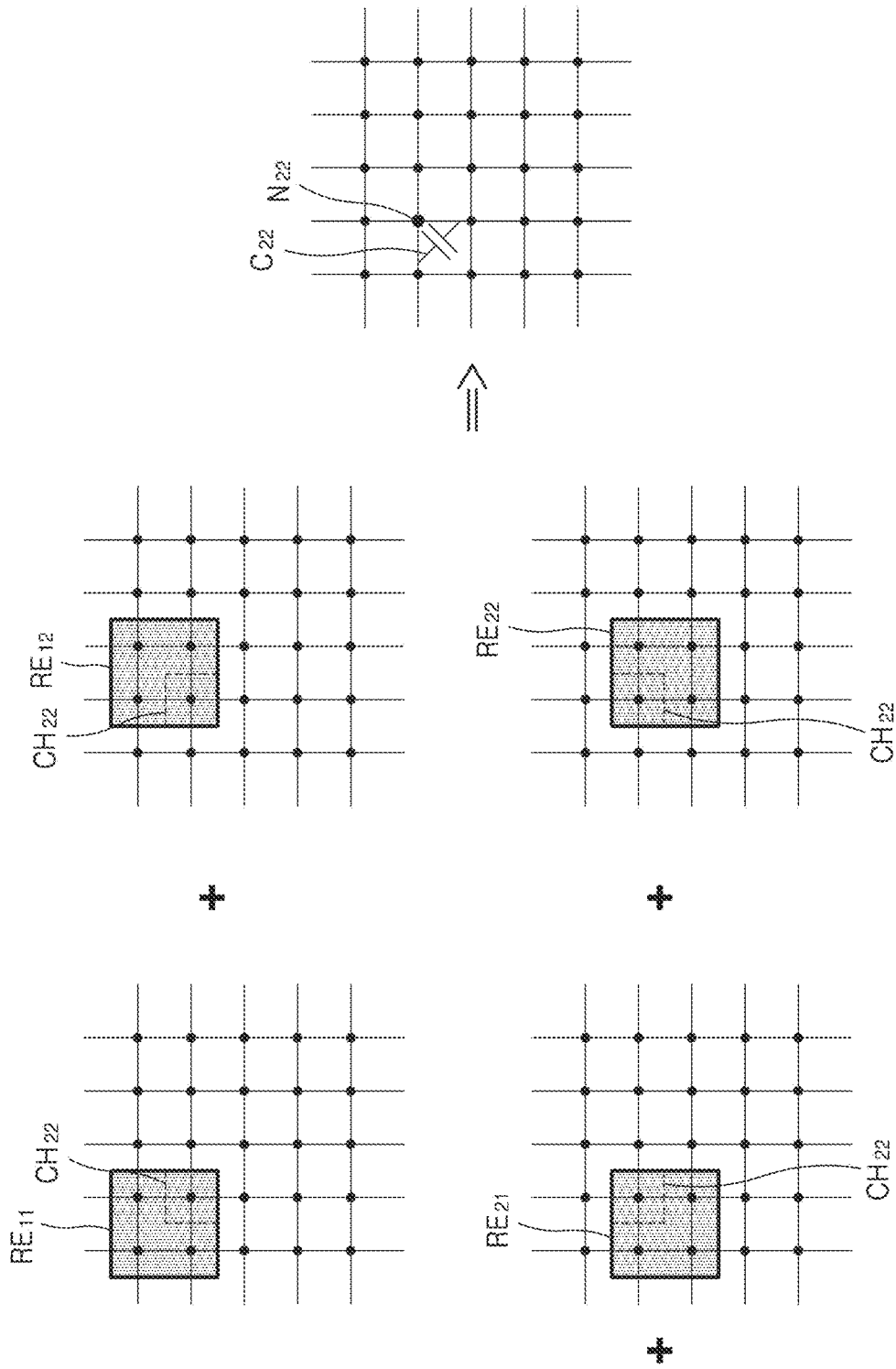
FIG. 10 is a diagram for explaining another example in which a processor calculates a mutual capacitance of a node according to an example embodiment.

FIG. 10 is a diagram for explaining another example in which the processor 130 calculates the mutual capacitance $C_{22}$ of the node $N_{22}$ according to an example embodiment.

FIG. 10 shows a case where the activation region RE includes 2×2 channels, as shown in FIGS. 6 and 7. Referring to FIG. 10, each of the regions $RE_{11}$ and $RE_{12}$, a region $RE_{21}$, and a region $RE_{22}$ may include the channel $CH_{22}$ corresponding to the node $N_{22}$. The processor 130 may calculate mutual capacitances $GC_{11}$, $GC_{12}$, $GC_{21}$, and $GC_{22}$ of respective regions from electric signals obtained from the driving group Gr and the detection group Gr corresponding to the regions $RE_{11}$, $RE_{12}$, $RE_{21}$ and $RE_{22}$. The processor 130 may determine a weight of each of the mutual capacitances $GC_{11}$, $GC_{12}$, $GC_{21}$, and $GC_{22}$ as ¼, considering that a proportion of the channel $CH_{22}$ in each of the region $RE_{11}$, the region $RE_{12}$, the region $RE_{21}$, and the region $RE_{22}$ is ¼.

For example, the processor 130 may calculate the mutual capacitance $C_{22}$ using Equation 2 below.

$$C_{22} = \frac{GC_{11} + GC_{12} + GC_{21} + GC_{22}}{4} \quad \text{[Equation 2]}$$

The processor 130 may determine the weight of each of the mutual capacitances $GC_{11}$, $GC_{12}$, $GC_{21}$, and $GC_{22}$ obtained by a combination of the driving group Gd and the detection group Gr corresponding to each of the regions $RE_{11}$, $RE_{12}$, $RE_{21}$ and $RE_{22}$ as ¼. The processor 130 may determine a weight of each of mutual capacitances obtained by a combination of the remaining driving group Gd and detection group Gr that do not correspond to the regions $RE_{11}$, $RE_{12}$, $RE_{21}$ and $RE_{22}$ as 0.

Figure 11:
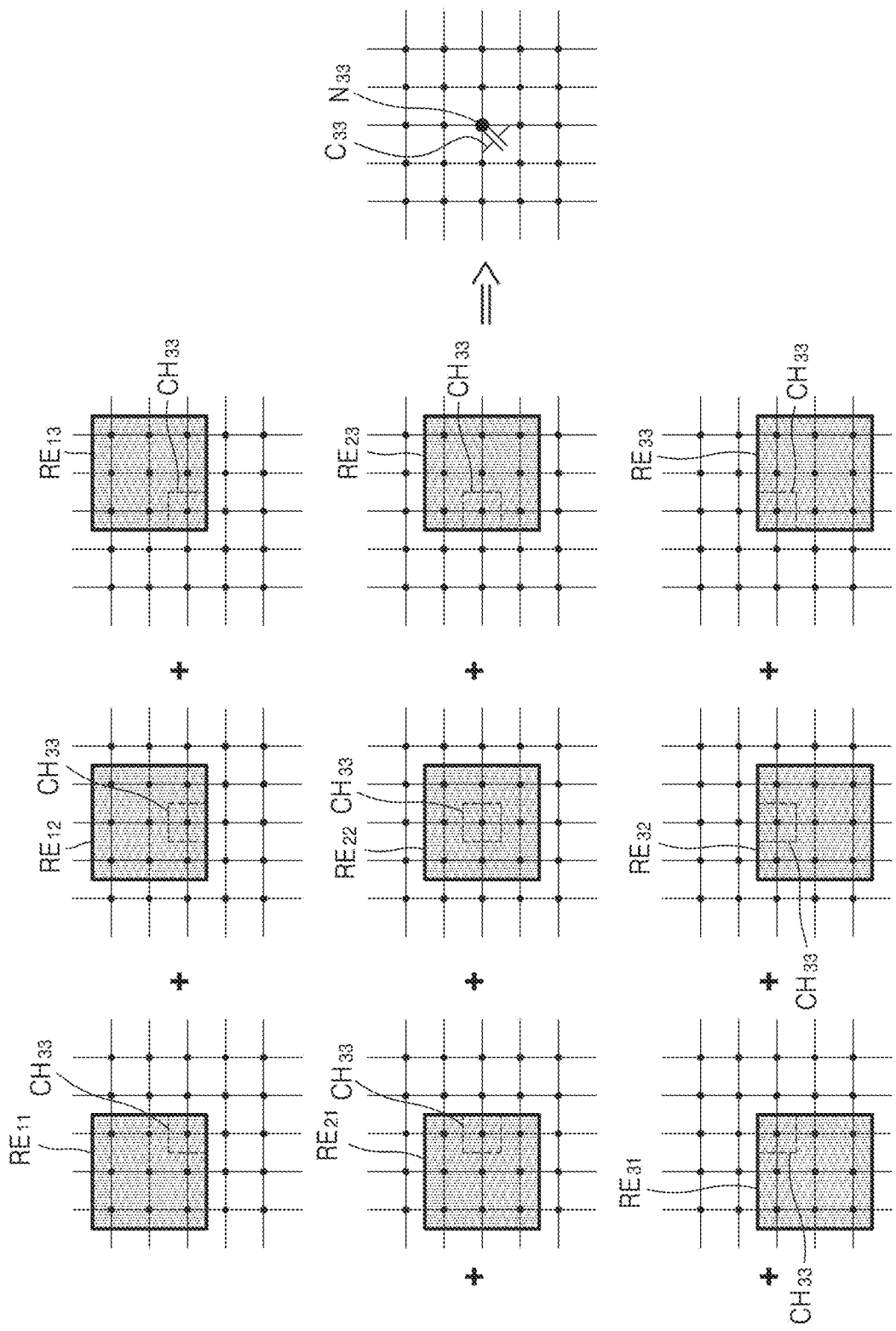
FIG. 11 is a diagram for explaining another example in which a processor calculates a mutual capacitance of a node according to an example embodiment.

FIG. 11 is a diagram for explaining another example in which the processor 130 calculates a mutual capacitance $C_{33}$ of a node $N_{33}$ according to an example embodiment.

Figure 13:
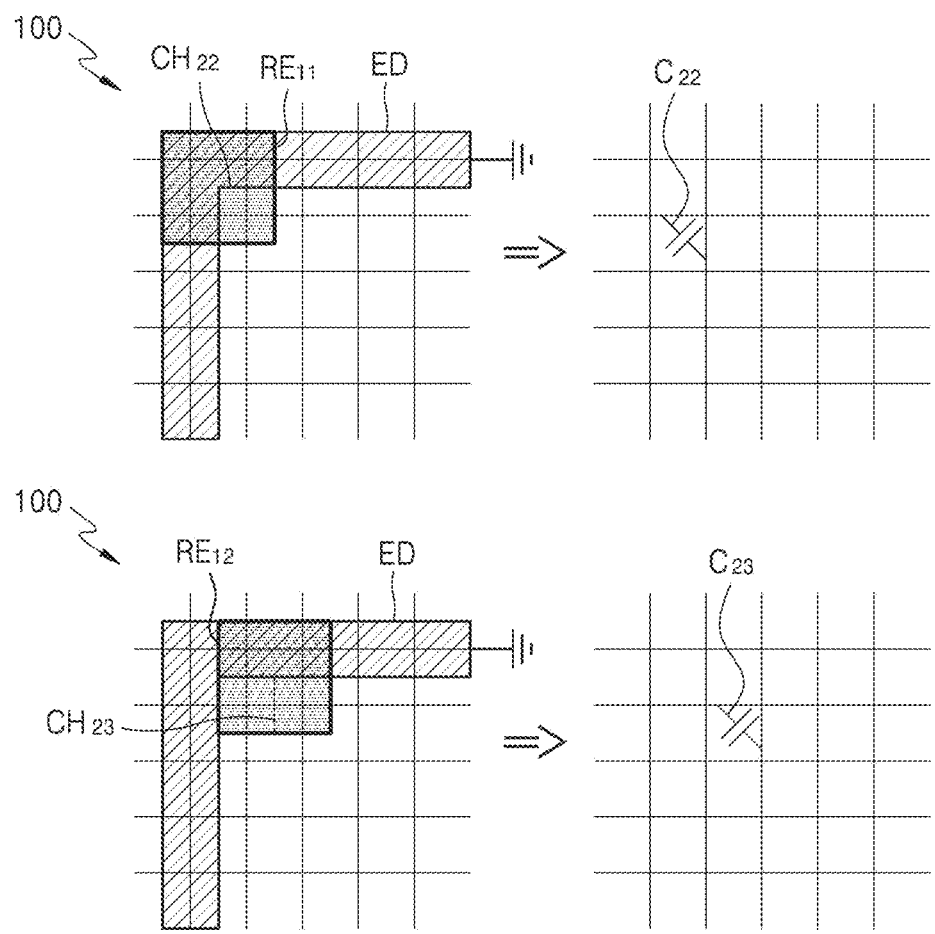
FIG. 13 is a diagram for explaining an example in which an electrode applies a fixed potential to some channels among channels included in a touch pad according to an example embodiment.

FIG. 11 shows a case where the activation region RE includes 3×3 channels, as shown in FIG. 8. Referring to FIG. 13, each of regions $RE_{11}$, $RE_{12}$, $RE_{13}$, $RE_{21}$, $RE_{22}$, $RE_{23}$, $RE_{31}$, $RE_{32}$, and $RE_{33}$ may include the channel $CH_{33}$. The processor 130 may calculate mutual capacitances $CG_{11}$, $CG_{12}$, $CG_{13}$, $CG_{21}$, $CG_{22}$, $CG_{23}$, $CG_{31}$, $CG_{32}$, and $CG_{33}$ of respective regions from electric signals obtained from the driving group Gd and the detection group Gr corresponding to each of the regions $RE_{11}$, $RE_{12}$, $RE_{13}$, $RE_{21}$, $RE_{22}$, $RE_{23}$, $RE_{31}$, $RE_{32}$, and $RE_{33}$. Considering that a proportion of the channel $CH_{33}$ in each of the regions $RE_{11}$, $RE_{12}$, $RE_{13}$, $RE_{21}$, $RE_{22}$, $RE_{23}$, $RE_{31}$, $RE_{32}$, and $RE_{33}$ is 1/9, the processor 130 may determine a weight of each of the mutual capacitances $CG_{11}$, $CG_{12}$, $CG_{13}$, $CG_{21}$, $CG_{22}$, $CG_{23}$, $CG_{31}$, $CG_{32}$, and $CG_{33}$ as 1/9.

For example, the processor 130 may calculate the mutual capacitance $CG_{33}$ using Equation 3 below.

$$C_{33} = \frac{GC_{11} + GC_{12} + GC_{13} + GC_{21} + GC_{22} + GC_{23} + GC_{31} + GC_{32} + GC_{33}}{9}$$ [Equation 3]

The processor 130 may determine the weight of each of the mutual capacitances $CG_{11}$, $CG_{12}$, $CG_{13}$, $CG_{21}$, $CG_{22}$, $CG_{23}$, $CG_{31}$, $CG_{32}$, and $CG_{33}$ obtained by a combination of the driving group Gd and the detection group Gr corresponding to each of the regions $RE_{11}$, $RE_{12}$, $RE_{13}$, $RE_{21}$, $RE_{22}$, $RE_{23}$, $RE_{31}$, $RE_{32}$, and $RE_{33}$ as 1/9 as shown in Equation 3 above. The processor 130 may determine a weight of each of mutual capacitances obtained by a combination of the remaining driving group and detection group that do not correspond to the regions $RE_{11}$, $RE_{12}$, $RE_{13}$, $RE_{21}$, $RE_{22}$, $RE_{23}$, $RE_{31}$, $RE_{32}$, and $RE_{33}$ as 0.

Meanwhile, the processor 130 may differently determine the weights of the mutual capacitances $CG_{11}$, $CG_{12}$, $CG_{13}$, $CG_{21}$, $CG_{22}$, $CG_{23}$, $CG_{31}$, $CG_{32}$, and $CG_{33}$. For example, since the channel $CH_{33}$ is located at the center of the region $RE_{22}$, in the mutual capacitance $GC_{22}$ of the region $RE22$, a contribution ratio of the mutual capacitance $C_{33}$ of the node $N_{33}$ may be higher than other regions. Thus, the processor 130 may give more weights on the mutual capacitance $GC_{22}$ in the region $RE_{22}$. For example, the processor 130 may calculate the mutual capacitance $C_{33}$ using Equation 4 below.

$$C_{33} = \frac{GC_{11} + GC_{12} + GC_{13} + GC_{21} + w \cdot GC_{22} + GC_{23} + GC_{31} + GC_{32} + GC_{33}}{w + 8}$$ [Equation 4]

In Equation 4 above, w denotes an arbitrary real number greater than 1. In Equation 4, the larger the value of w, the larger the weight of the mutual capacitance $GC_{22}$ in the region $RE_{22}$.

In the foregoing examples, the processor 130 may calculate the mutual capacitances of the nodes by determining weights of mutual capacitance values in the various regions RE.

Meanwhile, the processor 130 may calculate a mutual capacitance in each of nodes by using predetermined fixed potential values applied to predetermined channels in the touch pad 100. Hereinafter, an example in which the processor 130 calculates a mutual capacitance of a node by using fixed potential values will be described with reference to FIG. 12.

Figure 12:
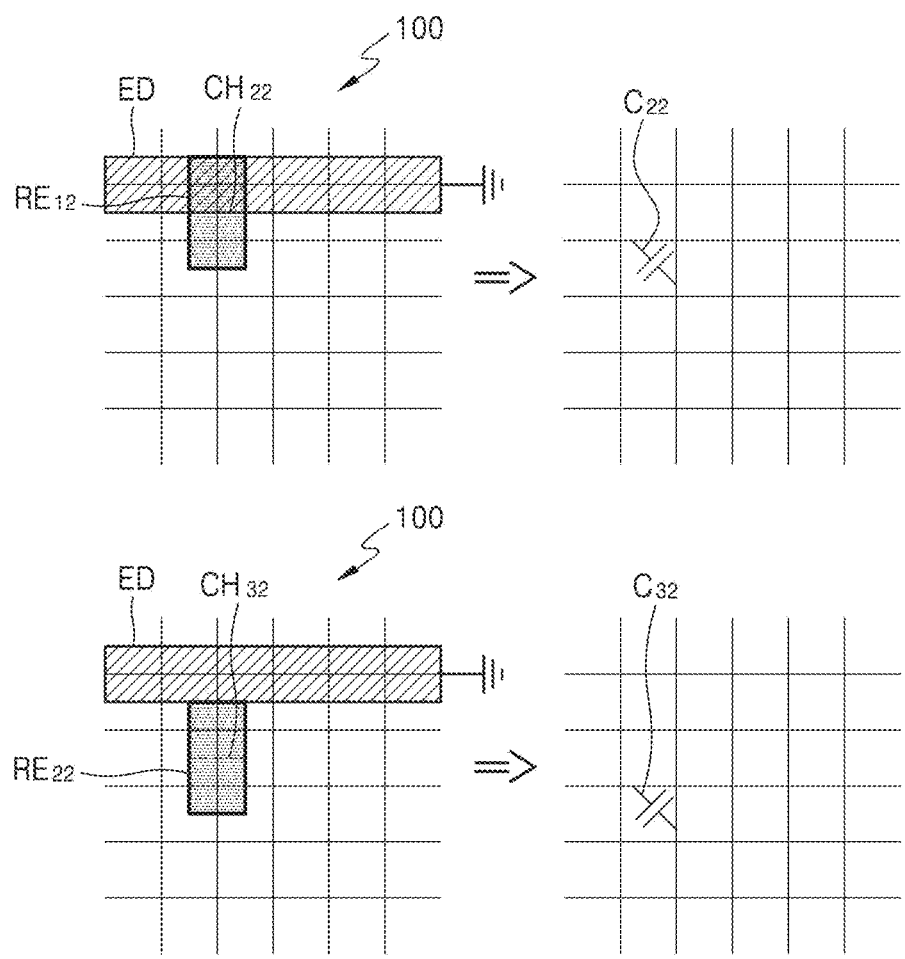
FIG. 12 is a diagram for explaining an example in which an electrode applies a fixed potential to some channels among channels included in a touch pad according to an example embodiment.

FIG. 12 is a diagram for explaining an example in which an electrode ED applies a fixed potential to some of channels included in the touch pad 100 according to an example embodiment.

FIG. 12 shows a calculation process of the processor 130 in a 2×1 measurement method described above with reference to FIGS. 4 and 5.

Referring to FIG. 12, the fingerprint image generating system 1 may further include the electrode ED applying the predetermined fixed potential to at least two channels among a plurality of channels formed on the touch pad 100. Here, the electrode ED may include a transparent indium tin oxide (ITO) electrode.

The electrode ED may be connected to a fixed potential such as a ground. In this case, the electrode ED may equalize a potential of channels in contact with the electrode ED with a ground potential, but embodiments are not limited thereto, for example, the ED may be connected to a potential that is not fixed. For example, the electrode ED may be connected to a predetermined power source such that the potential of the electrode ED may be maintained at the predetermined fixed potential by the power source.

The electrode ED may apply the fixed potential to channels located at the edges of the touch pad 100. For example, the electrode ED may apply the fixed potential to the uppermost channels of the touch pad 100. When the electrode ED is grounded, a fixed potential value may be equal to a ground potential value, but embodiments are not limited thereto. For example, when the electrode ED is connected to a power source, the fixed potential value may be different from the ground potential value.

When the fixed potential of constant magnitude is continuously applied to the uppermost channels of the touch pad 100, a mutual capacitance in the channels to which the fixed potential is applied may not change. That is, the mutual capacitance of the channels to which the fixed potential is applied may be fixed, regardless of whether a user's finger touches the touch pad 100. The processor 130 may calculate a mutual capacitance of a second channel based on a mutual capacitance in a region including a first channel to which the fixed potential is applied and the second channel adjacent to the first channel.

For example, the processor 130 may calculate the mutual capacitance $GC_{12}$ in the region $RE_{12}$ including the channel $CH_{12}$ to which the fixed potential is applied and the channel $CH_{22}$ adjacent to the channel $CH_{12}$. The processor 130 may calculate the mutual capacitance $GC_{22}$ in the channel $CH_{22}$ by adding or subtracting a mutual capacitance in the channel $CH_{12}$ having a value fixed by the fixed potential in the mutual capacitance $GC_{12}$ of the region $RE_{12}$. The processor 130 may calculate the mutual capacitance $C_{22}$ by using Equation 5 below.

$$C_{22} = GC_{12} - C_{12}$$ [Equation 5]

When the mutual capacitance $C_{22}$ is calculated from Equation 5 above, a mutual capacitance $C_{32}$ in a channel $CH_{32}$ adjacent to the channel $CH_{22}$ may be inductively calculated. For example, the processor 130 may calculate the mutual capacitance $GC_{22}$ in the region $RE_{22}$ including the channel $CH_{22}$ and a channel $CH_{23}$. Since the processor 130 determines a value of the mutual capacitance $C_{22}$ in the channel $CH_{22}$ from Equation 5, the processor 130 may calculate the mutual capacitance $C_{32}$ in the channel $CH_{32}$ by subtracting the mutual capacitance $C_{22}$ in the channel $CH_{22}$ from the mutual capacitance $GC_{22}$ in the region $RE_{22}$.

FIG. 13 is a diagram for explaining an example in which the electrode ED applies a fixed potential to some of channels included in the touch pad 100 according to an example embodiment.

FIG. 13 shows a calculation process of the processor 130 in a 2×2 measurement method described above with reference to FIGS. 6 and 7.

The electrode ED may apply the fixed potential to channels located at upper and left edges of the touch pad 100. In this case, mutual capacitance values of the channels located at the upper and left edges of the touch pad 100 on which the electrode ED applies the fixed potential may not change. Similar to the description provided above with reference to FIG. 12, the processor 130 may calculate the mutual capacitance $C_{22}$ in the channel $CH_{22}$ by subtracting the previously known mutual capacitances $C_{11}$, $C_{12}$, and $C_{21}$ in the channels $CH_{11}$, $CH_{12}$, and $CH_{21}$ from the mutual capacitance $GC_{11}$ in the region $RE_{11}$. The processor 130 may also inductively calculate the mutual capacitance $C_{23}$ in the other channel $CH_{23}$ from the mutual capacitance $C_{22}$ in the channel $CH_{22}$.

As described above with reference to FIGS. 3 to 13, the processor 130 may group the driving electrodes Tx and the detection electrodes Rx such that the region RE to be activated in the touch pad 100 upon measuring a signal is increased. Since an area of the region RE to be activated increases, the performance of the fingerprint image generating system 1 may be improved. For example, the fingerprint image generating system 1 may obtain a high-quality image and improvement of sensing performance. The performance of the fingerprint image generating system 1 may also be improved by appropriately adjusting a weight of each of the mutual capacitances GC in the region RE when the processor 130 calculates mutual capacitances of nodes. When the fixed potential is applied to channels located at the edge of the touch pad 100, the processor 130 may more accurately calculate the mutual capacitance of each of the nodes.

As described above with reference to FIG. 2, the processor 130 may obtain first image data corresponding to a group including a plurality of pixels. More specifically, the transmission circuit 110 may apply a driving signal to the single driving electrode Tx or the driving group Gd including a plurality of driving electrodes, and the reception circuit 120 may measure an electrical signal output from the single detection electrode Rx or the detection group Gr including a plurality of detection electrodes. Then, the processor 130 may obtain the first image data by using the electric signal measured by the reception circuit 120.

Figure 14:
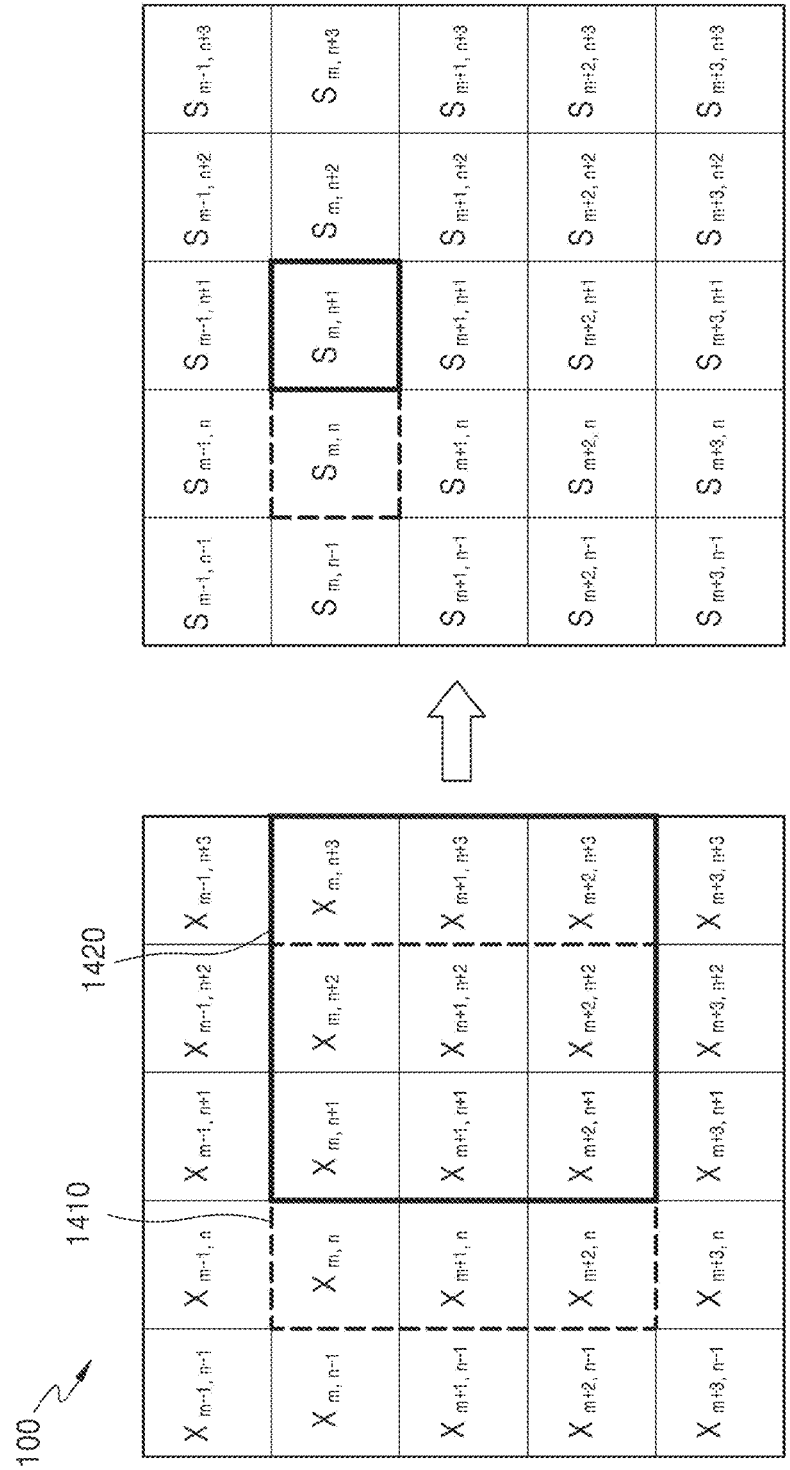
FIG. 14 is a diagram for explaining an example in which a processor obtains first image data according to an example embodiment.

FIG. 14 is a diagram for explaining an example in which the processor 130 obtains first image data S according to an example embodiment.

In FIG. 14, 5×5 pixels corresponding to the touch pad 100 are shown. The touch pad 100 may include five driving electrodes Tx and five detection electrodes Rx. Hereinafter, it is assumed that 3×3 pixels form one group. For example, referring to FIG. 14, it is assumed that a first group 1410 includes 9 pixels $x_{m,n}$, $x_{m,n+1}$, $x_{m,n+2}$, $x_{m+1,n}$, $x_{m+1,n+1}$, $x_{m+1,n+2}$, $x_{m+2,n}$, $x_{m+2,n+1}$, and $x_{m+2,n+2}$, and a second group 1420 includes other 9 pixels $x_{m,n+1}$, $x_{m,n+2}$, $x_{m,n+3}$, $x_{m+1,n+1}$, $x_{m+1,n+2}$, $x_{m+1,n+3}$, $x_{m+2,n+1}$, $x_{m+2,n+2}$, and $x_{m+2,n+3}$. However, the number of pixels included in a group is not limited to 3×3.

The processor 130 may obtain the first image data corresponding to the first and second groups 1410 and 1420. For example, the first image data obtained by the processor 130 may be expressed as Equation 6 below.

$$S_{m,n} = \sum_{i=m}^{m+p} \sum_{j=n}^{n+q} w_{i,j} x_{i,j}, (m = 1, 2, \ldots, M; n = 1, 2, \ldots, N)$$ [Equation 6]

In Equation 6 above, S denotes the first image data, and x denotes a value of a single pixel. Also, w denotes a weight corresponding to the single pixel. Also, p and q denote values obtained by subtracting 1 from the number of pixels in a row direction and subtracting 1 from the number of pixels in a column direction in the first and second groups 1410 and 1420, respectively. For example, according to the first and second groups 1410 and 1420 shown in FIG. 14, p and q correspond to 2, respectively.

In Equation 6, the first image data S of the first group 1410 may be defined as the sum of products of the 9 pixels $x_{m,n}$, $x_{m,n+1}$, $x_{m,n+2}$, $x_{m+1,n}$, $x_{m+1,n+1}$, $x_{m+1,n+2}$, $x_{m+2,n}$, $x_{m+2,n+1}$, and $x_{m+2,n+2}$ and the weight w. Also, the first image data $S_{m,n+1}$ of the second group 1420 may be defined as the sum of products of the 9 pixels $x_{m,n+1}$, $x_{m,n+2}$, $x_{m,n+3}$, $x_{m+1,n+1}$, $x_{m+1,n+2}$, $x_{m+1,n+3}$, $x_{m+2,n+1}$, $x_{m+2,n+2}$, $x_{m+2,n+3}$ and the weight w.

As described above with reference to FIGS. 3 to 8, the reception circuit 120 may measure an electrical signal with respect to an activated region including a plurality of channels. Accordingly, the processor 130 may obtain the first image data $S_{m,n}$, $S_{m,n+1}$ corresponding to the first and second groups 1410 and 1420 including the plurality of pixels.

Further, the processor 130 may obtain first image data $S_{m-1,n-1}$, ..., $S_{m+3,n+3}$ with respect to each of the first and second groups 1410 and 1420 as described above.

In Equation 6 above, the weight $w_{i,j}$ may be previously calculated and stored in the memory 140. For example, the processor 130 may calculate the weight $w_{i,j}$ and write the calculated weight $w_{i,j}$ to the memory 140. For example, the processor 130 may calculate the weight $w_{i,j}$ corresponding to the pixels included in the group. Specifically, the processor 130 may calculate the weight $w_{i,j}$ based on mutual capacitances between driving electrodes and detection electrodes related to the pixels.

Figure 15C:
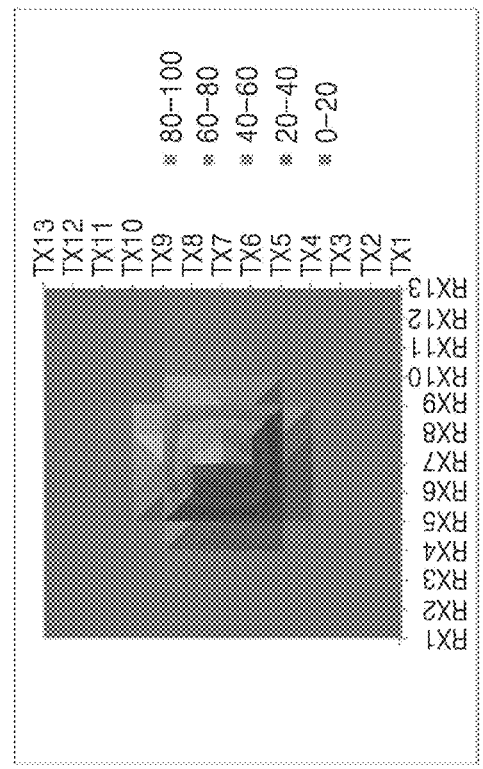
FIGS. 15A to 15C are diagrams for explaining examples of weights according to an example embodiment.
Figure 15A:
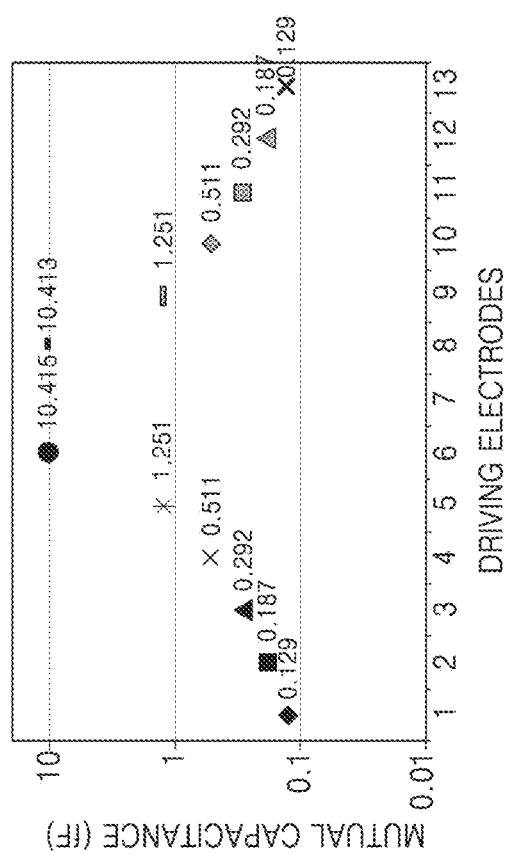
Figure 15B:
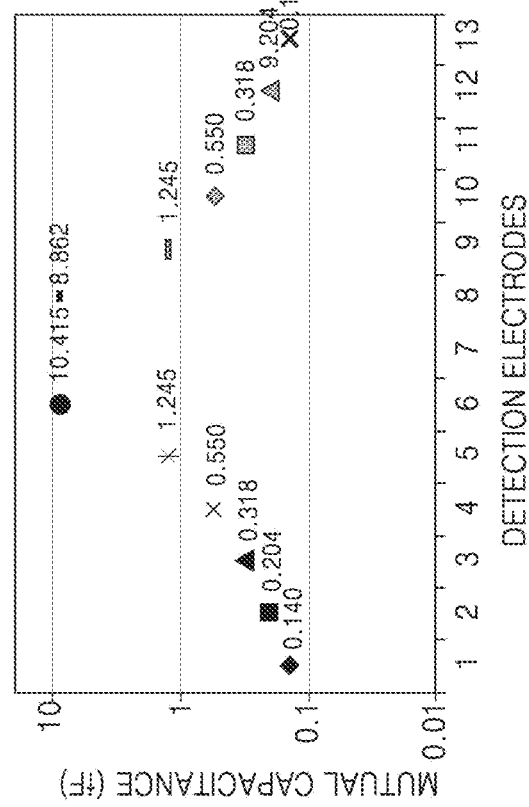

FIGS. 15A to 15C are diagrams for explaining an example of weights according to example embodiments.

FIG. 15A shows an example of mutual capacitances between a seventh driving electrode Tx7 and the other driving electrodes Tx. For example, a mutual capacitance between the seventh driving electrode Tx7 and the first driving electrode Tx1 may be calculated as 0.129 (fF), and a mutual capacitance between the seventh driving electrode Tx7 and a sixth driving electrode Tx6 may be calculated as 10.415 (fF).

Also, FIG. 15B shows an example of mutual capacitances between a seventh detection electrode Rx7 and the other detection electrodes Rx. For example, a mutual capacitance between the seventh detection electrode Rx7 and the second detection electrode Rx2 may be calculated as 0.204 (fF), and a mutual capacitance between the seventh detection electrode Rx7 and an eighth detection electrode Rx8 may be calculated as 8.862 (fF).

As described above with reference to FIGS. 9 through 13, the processor 130 may calculate the mutual capacitance using various methods. However, the mutual capacitance values are not limited to those shown in FIGS. 15A and 15B. That is, the mutual capacitance values may vary depending on the specifications of the driving electrodes Tx and the detection electrodes Rx. In other words, the mutual capacitance may be determined differently according to the specification of the touch pad 100.

The processor 130 may calculate a weight based on the mutual capacitances between the driving electrodes Tx and the detection electrodes Rx. For example, the weight may be calculated by multiplying the mutual capacitances between the driving electrodes Tx and the mutual capacitances between the detection electrodes Rx.

The weight may be derived in the form of a matrix. Here, elements constituting the matrix may be percentage values according to a combination of mutual capacitances. In other words, an element of the matrix may be expressed as a percentage, which is a value obtained by dividing the product of a mutual capacitance between the two driving electrodes Tx and a mutual capacitance between the two detection electrodes Rx by the maximum value. Here, the maximum value may mean the maximum value of the mutual capacitances. Thus, as shown in FIG. 15B, the elements of the matrix may represent a distribution of weighting functions.

The processor 130 may divide the first image data $S_{m,n}$, $S_{m,n+1}$ into second image data corresponding to each of the plurality of pixels by using the calculated weight. For example, the processor 130 may obtain values corresponding to the second image data by combining values corresponding to the first image data $S_{m,n}$, $S_{m,n+1}$ and the weight.

Figure 16:
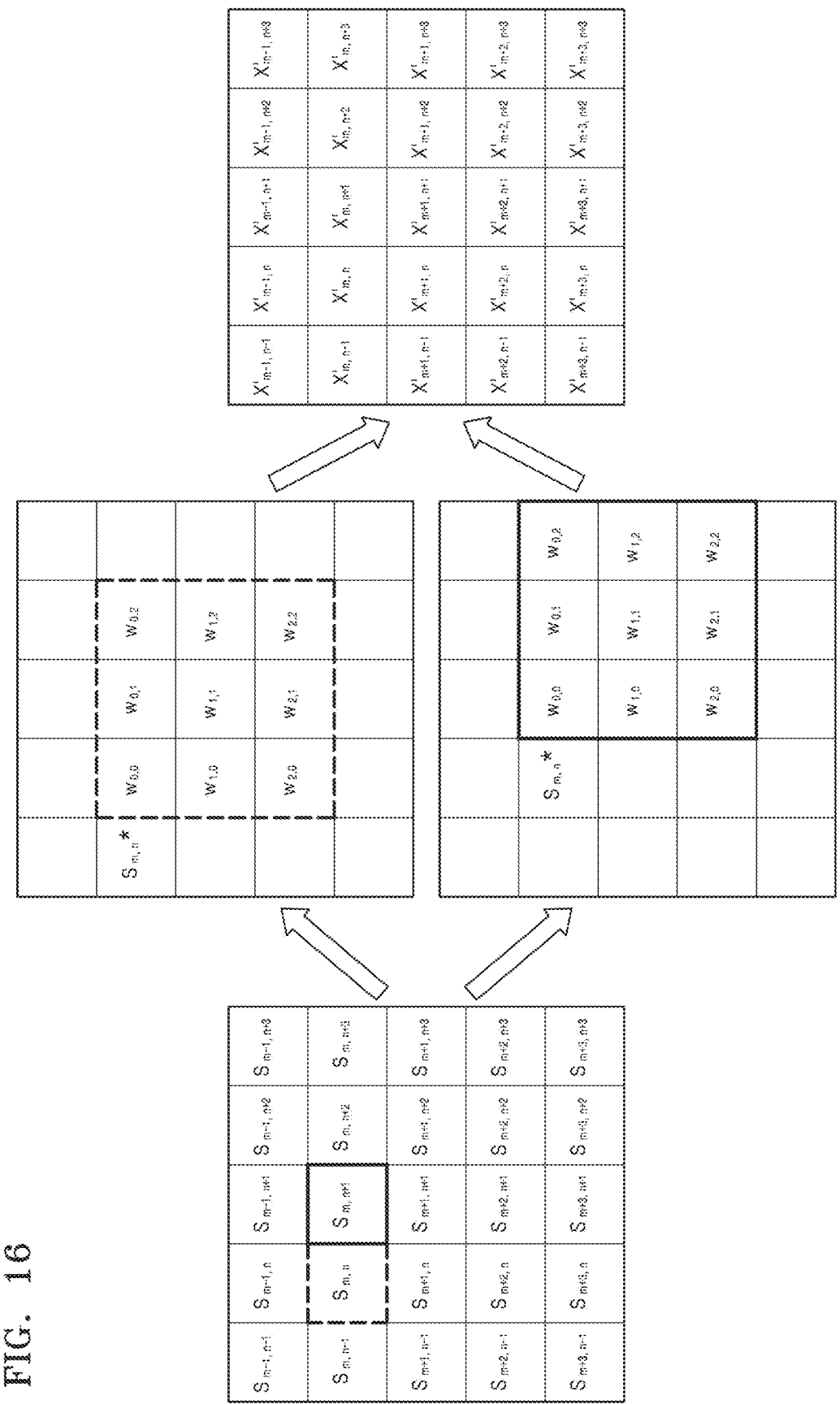
FIG. 16 is a diagram for explaining an example in which a processor obtains second image data according to an example embodiment.

FIG. 16 is a diagram for explaining an example in which the processor 130 obtains second image data x' according to an example embodiment.

FIG. 16 shows values corresponding to the first image data S described above with reference to FIG. 14. Therefore, hereinafter, it is assumed that 3×3 pixels form one group as described above with reference to FIG. 14.

Referring to FIG. 16, the processor 130 may combine the first image data $S_{m,n}$ and weights $w_{0,0}$, $w_{0,1}$, ..., $w_{2,2}$ to calculate second image data $x'_{m,n}$, $x'_{m,n+1}$, ..., $x'_{m+2,n+2}$ with respect to each of 9 pixels. For example, the processor 130 may calculate the second image data $x'_{m,n}$, $x'_{m,n+1}$, ..., $x'_{m+2,n+2}$ using Equation 7 below.

$$x'_{m,n} = \sum_{i=m}^{m-p}\sum_{j=n}^{n-q} w_{m-i,n-j} S_{i,j} \quad \text{[Equation 7]}$$

Variables shown in Equation 7 may be the same as described above with reference to Equation 6 above. Referring to Equation 6, values of the 9 pixels may be combined in the first image data S. Also, the first image data S may include an influence of mutual capacitances of the driving electrodes Tx and the detection electrodes Rx constituting the 9 pixels. Accordingly, the processor 130 may calculate the second image data x' with respect to each pixel by combining the weight w based on a mutual capacitance and the first image data S, as in Equation 7.

A first group corresponding to the first image data $S_{m,n}$ and a second group corresponding to the first image data $S_{m,n+1}$ may include pixels that overlap with each other. For example, since the first group and the second group differ by one row or one column, the first group and the second group may include the pixels that overlap with each other. Thus, the processor 130 may obtain the second image data x' according to Equation 7 above with respect to all groups including a specific pixel, to obtain the second image data $x'_{m,n}$ with respect to the specific pixel. Then, the processor 130 may finally determine the second image data $x'_{m,n}$ with respect to the specific pixel by summing the obtained second image data x'.

The processor 130 may generate an image using the obtained second image data x'.

Figure 17:
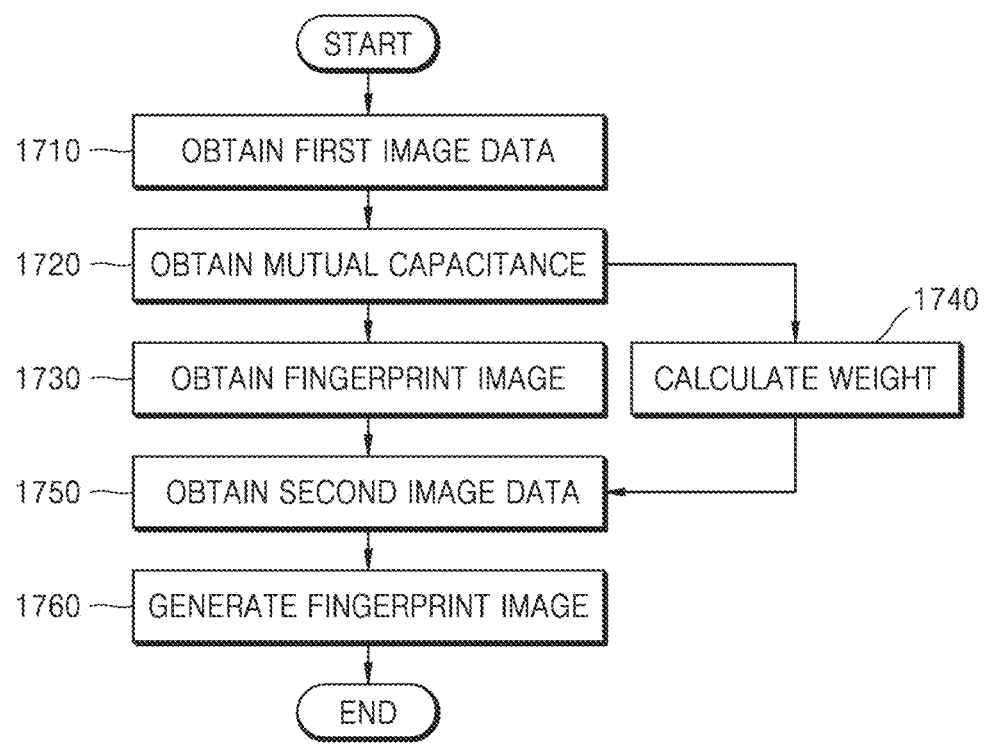
FIG. 17 is a flowchart showing an example of a method of generating a fingerprint image according to an example embodiment.

FIG. 17 is a flowchart showing an example of a method of generating a fingerprint image according to an example embodiment.

Referring to FIG. 17, the method of generating the fingerprint image may include operations that are time serially processed in the fingerprint image generating system 1 shown in FIG. 1. Therefore, it will be understood that descriptions provided above with respect to the fingerprint image generating system 1 shown in FIG. 1 apply to the method of generating the fingerprint image of FIG. 17.

In operation 1710, the processor 130 may obtain first image data. Here, the first image data may be data representing a group including a plurality of pixels. For example, the processor 130 may obtain the first image data according to the method described above with reference to FIGS. 3 to 8 and 14.

In operation 1720, the processor 130 may obtain a mutual capacitance. For example, the processor 130 may obtain the mutual capacitance according to the method described above with reference to FIGS. 9 to 13.

In operation 1730, the processor 130 may generate the fingerprint image by using the first image data. However, operation 1730 may be omitted.

In operation 1740, the processor 130 may calculate a weight by using the mutual capacitance. For example, the processor 130 may calculate the weight according to the method described above with reference to FIG. 15. The processor 130 may store the calculated weight in the memory 140 and use the weight stored in the memory 140 to obtain second image data. For example, the weight may be stored in memory 140 as a look-up table.

The processor 130 may calculate the weight and divide the first image data into the second image data by using the calculated weight. Also, the weight stored in the memory 140 may be updated by the processor 130.

In operation 1750, the processor 130 may obtain the second image data based on the calculated or stored weight. Here, the second image data may be data representing each of pixels included in a group. For example, the processor 130 may divide the first image data into the second image data according to the method described above with reference to FIG. 16.

In operation 1760, the processor 130 may generate the fingerprint image by using the second image data.

According to the descriptions above, the processor 130 may divide the first data with respect to a plurality of pixels into the second data with respect to each of the pixels. Therefore, a higher quality image may be generated than an image generated by using the first image data. Also, since the fingerprint image generating system 1 obtains the first image data, more precise data indicating an object touching the touch pad 100 may be obtained even when a thickness of a passivation layer on the touch pad 100 is greater than a certain value.

The example embodiments described above may be implemented as an executable program, and may be executed by a general-purpose digital computer that runs the program by using a computer-readable recording medium. Also, a structure of data used in the example embodiments described above may be recorded by using various units on a computer-readable medium. Examples of the non-transitory computer-readable medium include storage media such as magnetic storage media, e.g., read only memories (ROMs), floppy discs, or hard discs, optically readable media, e.g., compact disk-read only memories (CD-ROMs), or digital versatile disks (DVDs), etc. but embodiments are not limited thereto.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the drawings, it will be understood by those of ordinary skill in the art that various changes in form and details may be made therein without departing from the spirit and scope as defined by the following claims.

What is claimed is:

1. A method of processing data corresponding to a fingerprint image, the method comprising:
   obtaining first image data corresponding to a group comprising a plurality of pixels; and
   dividing the first image data into second image data corresponding to each of the plurality of pixels based on a plurality of weights corresponding to the plurality of pixels,
   wherein the dividing comprises obtaining a value of the second image data by summing a combination of a value of the first image data with each of the plurality of weights corresponding to the plurality of pixels included in the group, and
   wherein the plurality of weights are determined based on a plurality of mutual capacitances between driving electrodes and detection electrodes constituting the plurality of pixels.

2. The method of claim 1, wherein the plurality of weights comprise a matrix of percentage values based on a combination of the plurality of mutual capacitances.

3. The method of claim 2, wherein the matrix represent a distribution of the percentage values of the plurality of mutual capacitances based on a maximum value of a mutual capacitance among the plurality of mutual capacitances.

4. The method of claim 1, wherein the obtaining comprises:
   sequentially applying a driving signal to each of a plurality of driving electrodes included in the group; and
   obtaining the first image data based on a plurality of electrical signals measured from a plurality of detection electrodes included in the group.

5. The method of claim 1, further comprising:
   determining a mutual capacitance at each of a plurality of nodes where each of a plurality of driving electrodes included in the group and each of a plurality of detection electrodes included in the group intersect.

6. The method of claim 5, wherein the determining comprises:
   determining a mutual capacitance in a second channel based on a mutual capacitance in a region comprising a first channel and the second channel,
   wherein a fixed potential is applied to the first channel, and
   wherein the second channel is adjacent to the first channel.

7. The method of claim 1, further comprising generating the fingerprint image based on the second image data.

8. A non-transitory computer-readable recording medium having recorded thereon a computer program, which, when executed by a computer, performs the method of claim 1.

9. A data processing apparatus comprising:
   at least one processor configured to execute instructions in a computer program; and
   at least one memory storing at least a part of the computer program,
   wherein the at least one processor is further configured to obtain first image data corresponding to a group comprising a plurality of pixels and divide the first image data into second image data corresponding to each of the plurality of pixels based on a plurality of weights corresponding to the plurality of pixels, and
   wherein the at least one processor is further configured to obtain a value of the second image data by summing a combination of a value of the first image data with each of the plurality of weights corresponding to the plurality of pixels included in the group, and
   wherein the plurality of weights are determined based on a plurality of mutual capacitances between driving electrodes and detection electrodes constituting the plurality of pixels.

10. The data processing apparatus of claim 9, wherein the plurality of weights comprise a matrix of percentage values corresponding to a combination of the plurality of mutual capacitances.

11. The data processing apparatus of claim 10, wherein the matrix comprises a distribution of the percentage values of the plurality of mutual capacitances based on a maximum value of a mutual capacitance among the plurality of mutual capacitances.

12. The data processing apparatus of claim 9, wherein the at least one processor is further configured to sequentially apply a driving signal to each of a plurality of driving electrodes included in the group, and obtain the first image data based on electrical signals measured from a plurality of detection electrodes included in the group.

13. The data processing apparatus of claim 9, wherein the at least one processor is further configured to determine a mutual capacitance at each of a plurality of nodes where each of a plurality of driving electrodes included in the group and each of a plurality of detection electrodes included in the group intersect.

14. The data processing apparatus of claim 13, wherein the at least one processor is further configured to determine a mutual capacitance in a second channel based on a mutual capacitance in a region comprising a first channel and the second channel, wherein a fixed potential is applied to the first channel, and the second channel is adjacent to the first channel.

15. The data processing apparatus of claim 9, wherein the at least one processor is further configured to generate a fingerprint image based on the second image data.

16. A data processing apparatus comprising:
   at least one processor configured to execute instructions in a computer program;
   at least one memory storing at least a part of the computer program;
   a transmission circuit configured to provide driving signal to a plurality of driving electrodes; and
   a reception circuit configured to determine electric signals from a plurality of detection electrodes that cross the plurality of driving electrodes,
   wherein the at least one processor is further configured to obtain first image data corresponding to a group comprising a plurality of pixels and divide the first image data into second image data corresponding to each of the plurality of pixels based on a plurality of weights corresponding to the plurality of pixels, and
   wherein the at least one processor is further configured to obtain a value of the second image data by summing a combination of a value of the first image data with each of the plurality of weights corresponding to the plurality of pixels included in the group, and wherein the plurality of weights are determined based on a plurality of mutual capacitances between driving electrodes and detection electrodes constituting the plurality of pixels.

17. The data processing apparatus of claim 16, wherein the at least one processor is further configured to generate a fingerprint image based on the second image data.

\* \* \* \* \*